US012580169B2

(12) United States Patent
Rai

(10) Patent No.: US 12,580,169 B2
(45) Date of Patent: Mar. 17, 2026

(54) MASS SPECTROMETRY TO IDENTIFY PREDICTIVE FAILURE WITH CHEMICAL DETECTION IN MICROELECTRONIC SYSTEMS

(71) Applicant: Purdue Research Foundation, West Lafayette, IN (US)

(72) Inventor: Hersh Rai, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 381 days.

(21) Appl. No.: 18/270,335

(22) PCT Filed: Dec. 22, 2021

(86) PCT No.: PCT/US2021/064802

§ 371 (c)(1),
(2) Date: Jun. 29, 2023

(87) PCT Pub. No.: WO2022/146812

PCT Pub. Date: Jul. 7, 2022

(65) Prior Publication Data

US 2024/0063007 A1 Feb. 22, 2024

Related U.S. Application Data

(60) Provisional application No. 63/131,845, filed on Dec. 30, 2020.

(51) Int. Cl.
*H01J 49/00* (2006.01)
*H01J 49/14* (2006.01)

(52) U.S. Cl.
CPC ...... *H01J 49/0036* (2013.01); *H01J 49/0013* (2013.01); *H01J 49/004* (2013.01); *H01J 49/145* (2013.01)

(58) Field of Classification Search
CPC .. H01J 49/0036; H01J 49/0013; H01J 49/004; H01J 49/145; H01J 49/0422; G01N 33/0047
See application file for complete search history.

(56) References Cited

U.S. PATENT DOCUMENTS 6,975,944 B1 * 12/2005 Zenhausern ....... G01N 33/0047 702/30
9,502,226 B2 * 11/2016 Brown ................ H01J 49/4245
2017/0169999 A1 * 6/2017 Gordon .................. H01J 49/10

* cited by examiner

*Primary Examiner* — David E Smith
(74) *Attorney, Agent, or Firm* — Brown Rudnick LLP; Adam M. Schoen

(57) ABSTRACT

The invention generally relates to systems and methods for analyzing operational status of an electronic instrument. In certain embodiments, the invention provides systems that include a sampling module that operable couples to an electronic instrument in a manner that the sampling module receives a vapor emitted from the electronic instrument, the sampling module comprising an ionization source and one or more mass analyzers to thereby produce a chemical signature of one or more analytes in the vapor; and an analysis module operable coupled to the sampling module to receive the chemical signature of the one or more analytes in the vapor and compare the received chemical signature to a database of known chemical signatures to thereby determine operational status of the electronic instrument.

14 Claims, 25 Drawing Sheets

MASS SPECTROMETRY TO IDENTIFY PREDICTIVE FAILURE WITH CHEMICAL DETECTION IN MICROELECTRONIC SYSTEMS

RELATED APPLICATION

The present application is a 35 U.S.C. § 371 national phase application of PCT/US21/64802, filed Dec. 22, 2021, which claims the benefit of and priority to U.S. provisional patent application Ser. No. 63/131,845, filed Dec. 30, 2020, the content of each of which is incorporated by reference herein in its entirety.

FIELD OF THE INVENTION

The invention generally relates to systems and methods for analyzing operational status of an electronic instrument.

BACKGROUND

Ever since the first invention of computers, signature analysis has been studied to help in identifying assurance and failure within systems. In a study performed by Weichbrodt (1968), he writes "With the rapidly increasing demands for product reliability, it has become apparent that . . . fault detection methods must be re-examined and improved" (p. 569). Since 1968, this topic has been introduced and continuously studied to improve the efficiency and performance of the process. In more recent years, signature analysis is being used on large level computer systems and applications to better utilize fault detection and diagnostic techniques. As the methods to detect signals become stronger in the modern era, developments must continue progressing to improve fault detection and prevent system casualties.

SUMMARY

The invention provides systems and methods for identifying predictive failure in microelectronic systems using chemical detection processes. Aspects of the invention are based on identification of different outputs of computer failure based on chemical signatures produced to improve fault detection and diagnostic techniques. In that manner, the invention provides systems and methods to predict failure within electronic processing systems via chemical detection and analysis. As multiple processes used for fault and failure detection are largely reactive, a predictive method allows for the system to be treated and restored to functionality prior to further damage occurring. In addition, the common composition of microelectronics within these systems provide a potential overlap to have similar chemical makeups. Thus, chemical detection is suggested for use to pre-emptively identify failure from an operational state versus failure state.

In certain aspects, the invention provides systems for analyzing operational status of an electronic instrument. The system includes a sampling module that operable couples to an electronic instrument in a manner that the sampling module receives a vapor emitted from the electronic instrument, the sampling module comprising an ionization source and one or more mass analyzers to thereby produce a chemical signature of one or more analytes (e.g., oxalic acid and/or hydroxypentanoic acid) in the vapor; and an analysis module operable coupled to the sampling module to receive the chemical signature of the one or more analytes in the vapor and compare the received chemical signature to a database of known chemical signatures to thereby determine operational status of the electronic instrument.

In certain embodiments, the ionization source is an atmospheric pressure chemical ionization (APCI) source. The APCI source may include an inlet that is configured to receive the vapor emitted from the electronic instrument. The APCI source ionizes the vapor to produce ions of the one or more analytes that are transferred to the one or more mass analyzers. In certain embodiments, the system comprises a single mass analyzer. In such embodiments, the single mass analyzer is a component of a miniature mass spectrometer. In other embodiments, the system comprises a plurality of mass analyzers arranged for tandem mass analysis.

In other aspects, the invention provides methods for analyzing operational status of an electronic instrument. The methods may involve receiving a vapor emitted from an electronic instrument to a sampling module that is operable coupled to the electronic instrument, the sampling module comprising an ionization source and one or more mass analyzers to thereby produce a chemical signature of one or more analytes (e.g., oxalic acid and/or hydroxypentanoic acid) in the vapor; and comparing, via an analysis module operably coupled to the sampling module, the received chemical signature to a database of known chemical signatures to thereby determine operational status of the electronic instrument.

In certain embodiments, the method is repeated at one or more additional points in time to continuously monitor a status of the electronic instrument. A change in the received chemical signature over time indicates a change in operational status of the electronic instrument. The change may be predictive of failure of the electronic instrument.

In certain embodiments, the method is conducted without interfering with the operability of the electronic instrument. In certain embodiments, the method is conducted non-invasively on the electronic instrument. In certain embodiments, the method is conducted using a miniature mass spectrometer.

DETAILED DESCRIPTION

Figure 1:
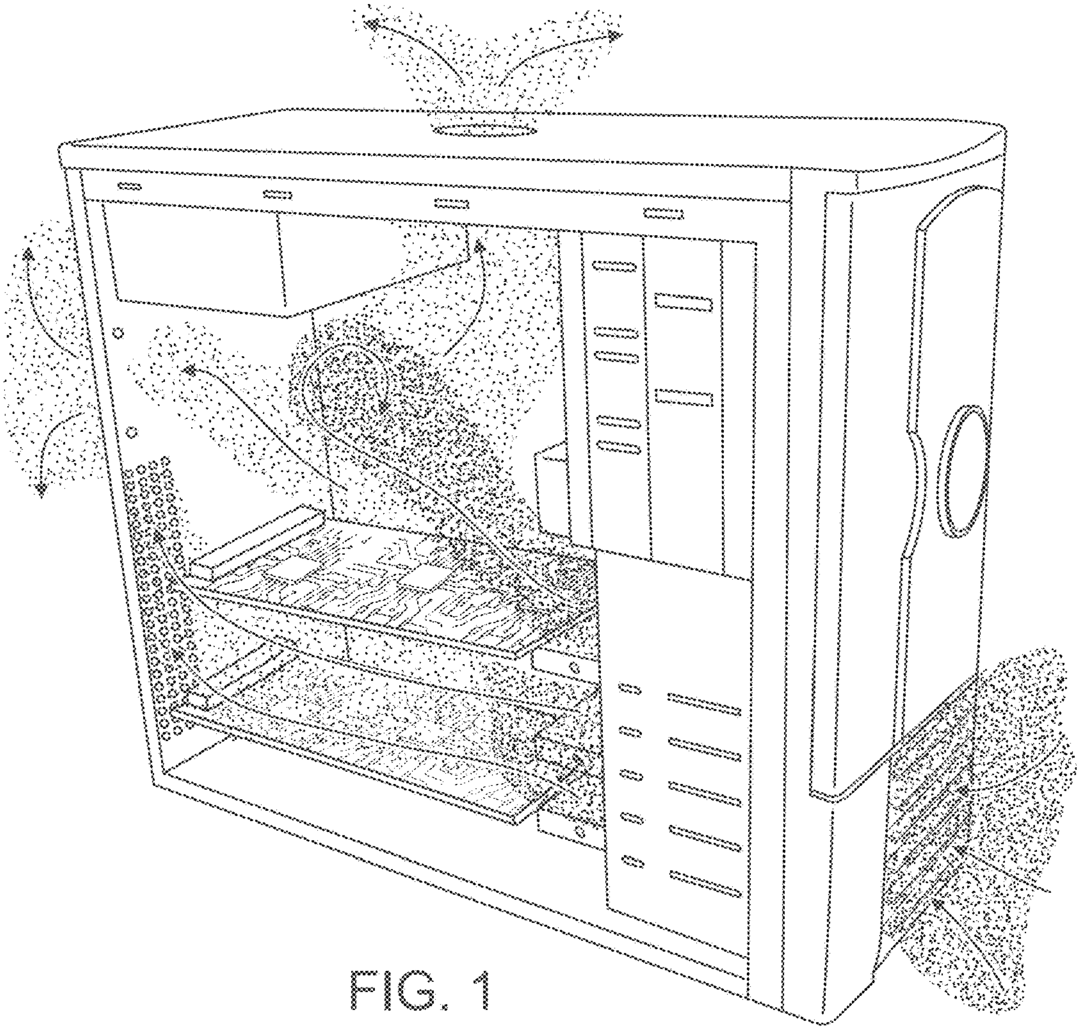
FIG. 1 shows Theoretical computer airflow.

The world of technology continues to grow each moment and is embraced in all parts of society. However, computing technology is susceptible to failure from being overworked in certain environments and operational settings. This work seeks to identify the feasibility of fault detection and diagnostics from the basis of chemical signature analysis of microelectronics within a system.

Multiple studies relating to fault detection methods exist as fault detection is employed to monitor and maintain the status of an electronic system. The work focuses on chemical detection methods as a means of fault detection and diagnosis within electronic systems. The chemical detection method utilizes Atmospheric Pressure Chemical Ionization with Mass Spectrometry to perform bulk sampling procedures in order to create mass-to-charge spectra for interpretation. Importantly, this method focuses on non-invasive and pre-emptive failure detection in electronic systems.

Each microelectronic within a computing system has a unique chemical composition, and thus unique bulk chemical signature produced upon failure. The study provides an example that focuses on Raspberry Pis to test chemical signature output at the power supply in an operational and failure state. The skilled artisan will recognize that this is only an example and that the work herein broadly applies to all electronic instruments.

By analyzing the signature, predictive failure can be identified (e.g., with the evolution of Oxalic acid) prior and after power supply failure. In conjunction, the tandem mass spectrometry results collected display, for example, the evolution of Oxalic acid as carbon dioxide and water molecules are lost resulting in decarboxylation and dehydration of the Raspberry Pi. Through this research, one is provided with predictive fault detection capabilities using chemical detection.

In the work herein, Raspberry Pis (RPs) serve as an example of a basic electronic system based on printed circuit boards. Fundamentally, a RP has multiple microelectronics connected to one another on the printed circuit board, similar to a larger electronic system, that performs similar processes and tasks. The use of RPs will assist in methods of overworking the systems to generate different types of chemical signatures. Results from the trials will be compared using the unique signatures collected from the RPs. This research seeks to identify chemical signatures which will be useful for the DoD to determine if new methods of fault detection and diagnosis can be used based on the signatures to better prevent and respond to failures in electronic systems.

Computer Hardware and Composition

A computer is commonly known as an electronic system used to store and process data. The computer is composed of multiple smaller devices that make up the hardware. These devices, known as microelectronics, demonstrate a crucial role in the overall functionality of the computer to ensure proper performance and output. Each microelectronic plays a unique role in the operation or task dictated by the user in order to process the end result.

Hardware is common across multiple types of computers. The key hardware components of a computer may include the motherboard, central processing unit, the chipset, the random-access memory (RAM), the memory modules (hard drive), bus, storage drive, and ports (Indrajit & Alam, 2020, p. 162). The chemical composition of each component can be vastly different. Multiple chemicals and elements make up the final composition of a computer. In Table 2.1, common chemicals and elements within a personal computer are shown with the estimated content percentage and location (Beals, Rangarajan, & Rao, 2001, n.p.).

TABLE 2.1

Finished Computer Composition

| Name | Content (% of total weight) | Weight of material in computer (lbs.) | Recycling Efficiency (current recyclability) | Use/Location |
|---|---|---|---|---|
| Plastics | 22.9907 | 13.8 | 20% | includes organics, oxides other than silica |
| Lead | 6.2988 | 3.8 | 5% | metal joining, radiation shield/ Cathode Ray Tube (CRT). Printed Wiring Board (PWB) |
| Aluminum | 14.1723 | 8.5 | 80% | structural, conductivity/housing, CRT, PWB, connectors |

TABLE 2.1-continued

| Finished Computer Composition | | | | |
|---|---|---|---|---|
| Name | Content (% of total weight) | Weight of material in computer (lbs.) | Recycling Efficiency (current recyclability) | Use/Location |
| Germanium | 0.0016 | <0.1 | 0% | Semiconductor/PWB |
| Gallium | 0.0013 | <0.1 | 0% | Semiconductor/PWB |
| Iron | 20.4712 | 12.3 | 80% | structural, magneticity/(steel) housing, CRT, PWB |
| Tin | 1.0078 | 0.6 | 70% | metal joining/PWB, CRT |
| Copper | 6.9287 | 4.2 | 90% | Conductivity/CRT, PWB, connectors |
| Barium | 0.0315 | <0.1 | 0% | in vacuum tube/CRT |
| Nickel | 0.8503 | 0.51 | 80% | structural, magneticity/(steel) housing, CRT, PWB |
| Zinc | 2.2046 | 1.32 | 60% | battery, phosphor emitter/PWB, CRT |
| Tantalum | 0.0157 | <0.1 | 0% | Capacitors/PWB, power supply |
| Indium | 0.0016 | <0.1 | 60% | transistor, rectifiers/PWB |
| Vanadium | 0.0002 | <0.1 | 0% | red phosphor emitter/CRT |
| Terbium | 0 | 0 | 0% | green phosphor activator, dopant/CRT, PWB |
| Beryllium | 0.0157 | <0.1 | 0% | thermal conductivity/PWB, connectors |
| Gold | 0.0016 | <0.1 | 99% | Connectivity, conductivity/PWB, connectors |
| Europium | 0.0002 | <0.1 | 0% | phosphor activator/PWB |
| Titanium | 0.0157 | <0.1 | 0% | pigment, alloying agent/(aluminum) housing |
| Ruthenium | 0.0016 | <0.1 | 80% | resistive circuit/PWB |
| Cobalt | 0.0157 | <0.1 | 85% | structural, magneticity/(steel) housing, CRT, PWB |
| Palladium | 0.0003 | <0.1 | 95% | Connectivity, conductivity/PWB, connectors |
| Manganese | 0.0315 | <0.1 | 0% | structural, magneticity/(steel) housing, CRT, PWB |
| Silver | 0.0189 | <0.1 | 98% | Conductivity/PWB, connectors |
| Antinomy | 0.0094 | <0.1 | 0% | diodes/housing, PWB, CRT |
| Bismuth | 0.0063 | <0.1 | 0% | wetting agent in thick film/PWB |
| Chromium | 0.0063 | <0.1 | 0% | Decorative, hardener/(steel) housing |
| Cadmium | 0.0094 | <0.1 | 0% | battery, glu-green phosphor emitter/housing, PWB, CRT |
| Selenium | 0.0016 | 0.00096 | 70% | rectifiers/PWB |
| Niobium | 0.0002 | <0.1 | 0% | welding allow/housing |
| Yttrium | 0.0002 | <0.1 | 0% | red phosphor emitter/CRT |
| Rhodium | 0 | | 50% | thick film conductor/PWB |
| Platinum | 0 | | 95% | thick film conductor/PWB |
| Mercury | 0.0022 | <0.1 | 0% | batteries, switches/housing, PWB |
| Arsenic | 0.0013 | <0.1 | 0% | doping agents in transistors/PWB |
| Silica | 24.8803 | 15 | 0% | glass, solid state devices/CRT, PWB |

Table 2.1 shows that the most common chemicals and elements within a computer include Silica, Plastics, Iron, Aluminum, Copper, and Lead. As noted, the chemical composition within a computer is extremely variable. This is due to the multiple subcomponents, or microelectronics, built within the system. The microelectronics have different chemical compositions that may result in different types of failures and signature outputs to be given at time of interpretation.

Although hardware continues to improve, the common chemical compounds and associated elements used may change minimally. As failure within computers are detected, the compounds identified may stay the same over time—especially for specific microelectronics within the computer. Ultimately, the packaging and chemical composition of each microelectronic may result in different, yet unique chemical signatures for failure identification.

Heat & Airflow in Computer Systems

Microelectronics within an electronic system are each operating synchronously in order to fulfill the process presented by the user. A common characteristic within these electronic systems is that heat is generated upon the processes being performed. In a U.S. patent filed by Yin, he notes that the heat generated may be detrimental to the device if it is not dissipated or removed internally (2003, p. 5). If the heat energy is not properly cycled, it may permanently damage the device that ultimately will cause failure and compromise functionality.

Multiple methods exist to manage the airflow within the enclosed electronic system. These methods focus on cooling the internal microelectronic components. Two types of cooling solutions exist to include active and passive. In a paper by Ellsworth, he notes that active cooling solutions include fans or water blocks—anything with moving parts (2012, p. 2). The passive cooling involves non-mechanical methods such as heat sinks or leaving components [microelectronics] exposed to air (2012, p. 2). Each method must be considered in terms of cost, location, and how air flow may be handled within the computer to ensure functionality is maintained.

Airflow contributes significantly to an electronic system's heat generation if not taken care of properly. Within FIG. 1, the theoretical airflow within a standard size computer case is shown (2012, p. 3). The computer has air cooling solutions used in order to dissipate heat within the casing. The external-temperature air travels through the front and passes over microelectronics within the system. Referencing the rotational arrow, a fan is used to circulate the air to cool the components and dissipate heat out of the casing. The amount of airflow that enters versus exits the casing affects the internal temperature.

As noted previously, active solutions exist to maintain the internal temperature of an electronic system. Air cooling is the most common method in most electronic systems. Air cooling capabilities are mostly seen within the types of fans used within these systems. Factors such as the size, speed, noise level, and energy-use are considered when choosing a fan for air cooling (2012, p. 3-4). Beyond fans, liquid coolants are another common solution for cooling. The coolant is passed through different microelectronics and heat is dissipated using a radiator. The process is cyclical and continues to occur while the system is in use. Systems are chosen primarily based on cost and space within a computer.

In addition, multiple passive solutions exist to cool an electronic system. These solutions may be used in conjunction with the active solutions presented previously. Common examples include heat sinks, heat pipes, and heat spreaders. A heat sink is designed to transfer heat into itself from associated components (2012, p. 5). The heat is then dissipated into the surrounding air. The heat sink is generally installed into the component itself in order to have the best heat transfer performance. Further, heat pipes are used in conjunction with heat sinks. The primary purpose of the pipe is to project heat from a component to another heat sink. Finally, a heat spreader is used to spread heat generated over a large surface area. A spreader is typically found on modules of RAM (2012, p. 6).

Multiple types of solutions exist in order to manage the internal temperature within a system. As the demonstrated methods are for an enclosed system, an exposed system may implement similar methods but have other environmental factors to consider.

An Overview of Fault Detection

Fault detection is a component of engineering that involves monitoring a system, identifying a fault, and determining the cause and location of the fault. From the identification, preventive maintenance and fixes can be made to ensure the device or system maintains full operation and effectiveness. Devices and systems can include multiple hardware components and exist across multiple types of industry. Khalastchi and Kalech (2018) note that motivation for FDD is to facilitate damage recovery procedures caused by the fault in a system (p. 9:2). In order to identify what fault has occurred, specifying the fault down to the component or circuit level must be accounted for. According to Bauer (1968), a user is only interested in identifying a fault to the level of a replaceable unit (p. 1503). Through accountability of the entire system and its components, tests and sequencing of tests can best detect where faults are occurring. This provides the ability for the user to take action to fix the system. For a modern system such as a gearbox, "numerous faults occur in the gearbox causing discontinuity in production schedules in industries resulting to lower productivity" (Vigneshkumar, Shankar, Krishna, Supriya, 2018, p. 1). Multiple methods of fault detection may be utilized based on cost and efficiency to best assist the gearbox to maintain high levels of productivity. With modern systems, multiple faults may occur due to the numerous tasks or operations a certain system may be performing.

From a software perspective, agents are being used in systems to assist with automation and solutions for fault detection. Software agents are "a computer system that is situated in some environment, and that is capable of autonomous action in this environment in order to meet its design objectives" (Wooldridge & Jennings, 1995, p. 115). By using these agents, fault detection procedures are becoming automatic for detection and response methods for software-based faults. By automatically performing tests and monitoring a system, a greater number of faults are detected in the overall system over time. Then, dependent on the severity of the fault, the proper response and time to fix it will be allotted as necessary to bring the system back to operation. Furthermore, modern applications are focusing on both fault detection and fault correction methods within electronic systems. In a paper from Xiao, Cao, and Peng (2020), neural networks are used to develop prediction models for fault detection and correction procedures (p. 13). The data-driven method in neural networks allows for a greater number of faults to be detected and corrected due to no prior assumptions to include dependency between faults and the influence of staffing levels (p. 1). This allows for an efficient detection process with less overhead, that detects both the fault and resolves it.

Figure 2:
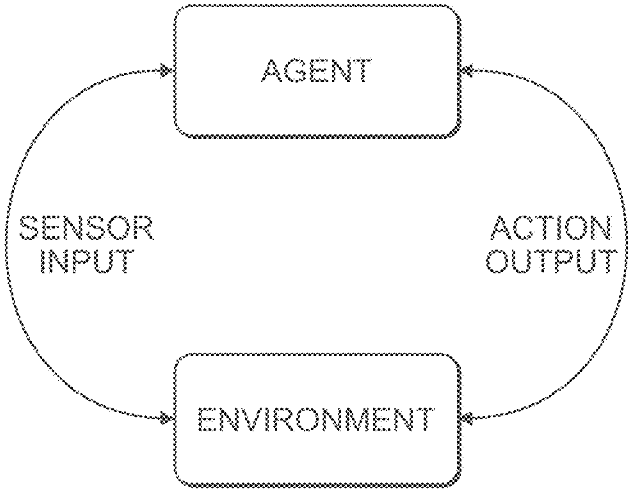
FIG. 2 shows a software agent in its native environment.

FIG. 2 references how a software agent within a FDD system may interact with its given environment (Liu, Logan, Cartes, 2005, p. 427). As shown in FIG. 2, the agent is constantly receiving and sending feedback to the environment (system) it is working in. The output given will affect the environment and its response to the fault detected.

Microelectronics in Fault Detection

The U.S. Office of Technology Assessment (1986) describes microelectronics as miniature electronic devices (p. 28). This technology represents the cornerstone of developing applications and technologies within multiple industries. Microelectronics consist of any part or component within the internal part of an electronic system. The microelectronics encompass the operational integrity of the system and ensure functionality. The procedure to create an electronic system involves designing, manufacturing, and using the components in order to specialize certain processes. Ismaeel and Bhatnagar (1995) write that microelectronic technologies are constantly changing which drives the necessity for reliability (p. 1). With rapid improvements and advancements being made, technology can become outdated in short periods of time. Through the emphasis of reliability, testing methods utilized for fault detection must be altered to best perform with the change in technology. The testing methods must be automated and repeated in order to detect and diagnose faults within the system. "The major problem in testing a circuit is that it cannot be tested exhaustively. To test an n-input logic circuit requires $2^n$ vectors to detect all the faults" (Ismaeel & Bhatnagar, 1995, p. 2). The scale of testing is not feasible for all components within the system. Certain microelectronics within the system will only be tested and restricted to possible faults that may occur and have a detrimental effect on the system.

In a fundamental study done by Campbell, Little, and Yung (1990), the architecture of a Hughes 3D computer was studied for fault tolerance and detection. In order to detect faults and contain efforts within the microelectronics a multi-level approach was adopted. The approach is as follows:

1. Application System: determines algorithms and fault tolerance requirements
2. 3D Software: implements fault isolation and reconfiguration
3. 3D Controller & I/O Interface Hardware: implements fault detection and provides redundancy
4. Wafers & Peripheral Circuitry: provides coarse-grained redundancy
5. Processing Elements (PEs) & Feedthrough Buses: provides fine-grained redundancy (Campbell, Little, & Yang, 1990, p. 176).

In order to properly detect and respond to the faults, the electronic system must have the proper processing power to handle the FDD method. As the FDD method generally does not have a processor of its own, it will rely on the processor of the electronic system. As with most programs or applications operating on a system, the FDD method can run as a background application using minimal processing power.

From the mentioned process, the test is run at each level in order to detect a fault in different micro components. If a fault is detected, it will be isolated and diagnosed to the lowest level of the system in order to restore functionality and system performance. Through the use of redundancy, the FDD response can handle the replacement of a microelectronic part or reduce the operation of a microelectronic component in the system.

Detection of Chemicals Processes

Electronic systems are composed of multiple microelectronics which each have distinct chemical compositions. Fault detection methods may be used to identify where a fault is occurring based on the composition and signature produced by the microelectronic. Mansouri, M. Nounou, H. Nounou, and Karim (2015) state that fault detection is commonly used for the proper operation of chemical processes (p. 334). As chemical processes and methods are monitored for possible discrepancies or changes in compounds, detection and prevention methods must be improved to account for these rapid changes.

As chemicals constitute everything around us, multiple applications can be studied for their uses and methods of detection. For example, a study by la Grone, Cumming, Fisher, Reust, and Taylor (1999) studies the chemical composition of landmines (p. 409). Landmines are used in military operations and are composed of multiple high-level explosive compounds. When placed in the ground, "The mixture of compounds escaping from the landmine form a 'chemical signature' representative of the explosive charge within the landmine" (p. 409). The signature produced is so slight, that the study emphasizes the necessity for new ultra-sensitive detect technologies to be produced. In this case, they are to be explosion specific in order to best monitor and detect explosions to determine the correct response if set off accidentally or purposefully.

Explosives are lethal and can cause a great amount of damage to the surrounding environment. Methods to detect and respond to explosives are used by operators in the battlefield for protection and defense against combatants. As chemical signatures are a primary detection method, feasibility to determine the type of chemical is possible within microelectronics. Forbes and Sisco (2015) emphasize that a multiple number of analytical techniques are used to detect these explosives (p. 2). As the threat of improvised and homemade explosives increases in conventional warfare, the growth of techniques for chemical detection is in greater demand. Although explosions are only one type of chemically composed compound, they are an essential component of studies involving chemical detection methods. The methods used in chemical detection can be expanded to other realms of research. Signature analysis and detection methods may be utilized to identify chemical compounds that react and produce a signature in order to better detect and prevent faults in a system.

Mass Spectrometry

Mass spectrometry is a widely used analytical tool used to measure a mass-to-charge ratio of molecule(s) within a sample. It is widely used for chemical composition measurements. According to the Broad Institute (2016), mass spectrometry can be used to identify unknown compounds via molecular weight determination. This information allows unknown compounds to be quantified, as well as assists in determining structure and chemical properties of molecules (n.p.). In order to get the data, each mass spectrometer has at least three known components:

1. The Ionization Source: Molecules are converted to gas phase ions so they can be moved about and manipulated by external electric and magnetic fields.
2. The Mass Analyzer: After ionization, the ions are sorted and separated based on mass-to-charge ratios.
3. Ion Detection System: The separated ions are measured and sent to a data system where the m/z ratios are stored together. Mass spectrums are delivered from this data collection. (The Broad Institute, 2016, n.p.).

Multiple versions and types of the above listed tools exist. As mass spectrometry methods are utilized to detect chemical compositions, distinctions can be found in the types of ions used to form the compound.

Mass spectrometry imaging (MSI) is a widely established technology which utilizes the principles of mass spectrometry. Falcetta, Morosi, Ubezio, Giordano, Decio, Giavazzi et al (2018) note that "The technique has the advantage of analyzing multiple molecules without prior knowledge while maintaining a relation" (p. 1). Having the ability to determine certain components without prior knowledge presents the advantage to not perform repeat testing. This provides the researcher the capability to focus efforts on experimentation related to the hypothesis studied rather than calibration of equipment or the spectrometer for use.

With a wide range of MSI applications, there are multiple tools available dependent on the type of use or experimentation. "Continual development and optimization of both ionization sources and analyzer technologies have resulted in a wide array of MSI tools available both commercially available and custom built, with each configuration possessing inherent strengths and limitations" (Paine et al., 2017, p. 7444). As the tools are constantly refined and improved, as well as expanded for use in other research areas, the potential for fault detection exists. As mass spectrometry is a tool utilized across multiple industries, the ability to acquire the correct equipment for experimentation is feasible.

In order to utilize fault detection in accompaniment with mass spectrometry, computer-aided diagnosis might need to be implemented. Computer-aided diagnosis (CAD) results in analyzing the components once identified and will allow the FDD method to take action as needed. In a study for Cancer Detection, "MSI reveals the localization of a broad scale of compounds ranging from metabolites to proteins in biological tissues. Computer-aided diagnosis (CAD) facilitate the analysis of the molecular profile in tumor tissues to provide a distinctive fingerprint for finding biomarkers" (Zanjani et al., 2019, p. 674). The mass spectrometry and CAD application design improve one another on getting real-time information and providing feedback. This may be a possible method to utilize to detect chemical signatures using mass spectrometry and assist a CAD-based program or application to perform FDD on the system.

Linear Trap Quadrupoles and Mass Spectrometry

Ion traps are commonly coupled with mass spectrometer functions in order to capture charged particles within an isolated system. "An ion trap mass spectrometer functions both as a mass spectrometer of considerable mass range and variable mass resolution and as an ion store in which gaseous ions can be confined" (March, 2017, p. 330). Through use of an ion trap mass spectrometer, the trajectory of the trapped ions of specific mass/charge rations become unstable upon the trapping field being changed. Thus, the ions leave the trapping field, once altered, in order of the mass/charge ratio. The ions are ejected rapidly from the trap and provide an output signal once released for interpretation (p. 330).

Specifically, a linear ion quadrupole (LTQ) is commonly used within mass spectrometry studies to provide specified data collection for targeted ions. "In a quadrupole, this [a much more sensitive detection of ions] is achieved by fixing the voltages so that the passage of ions is restricted to those with a given m/z value. When ion traps are used, only ions in a very narrow range of m/z are trapped" (Jorge et. al., 2007, p. 1392). Through trapping the ions, the mass spectrometer can perform mass scans by sweeping the voltages and keeping the frequency constant.

In a paper published by the National Institute of Health, LTQ mass spectrometers used are for ion trapping, ion selection, fragmentation reactions, and low-resolution ion detection (Kalli et. al., 2013, p. 2). There are multiple benefits of an LTQ in chemical analysis to include:

1) High sensitivity
2) Compactness and mechanical simplicity in a device which is nevertheless capable of high performance
3) Tandem mass spectrometry experiments are available by performing sequential mass analysis measurements
4) Ion/molecule reactions can be studied for mass-selected ions
5) High resolution is accessible through slow scans, but mass measure accuracy is relatively poor
6) Ions of high mass/charge are accessible using resonance experiments
7) Non-destructive detection is available using Fourier transform techniques (Wong & Cooks, 1997, p. 86-87).

As the readings from an LTQ-MS are highly sensitive, the readings and output provided represent an accurate picture of the potential chemical compounds that may result from the reading. Through these experiments, researchers are able to better understand mass/charge ratios, and how they apply to specific chemical compositions.

A current application LTQ-MS is used on includes acquiring information on mass-to-charge ratios for V-series chemical warfare agents. The Chemical Warfare convention outlines these agents and other chemical weapons being under glaring scrutiny, with global concern intensifying with every incident (Snyder et. al., 2019, p. 1). As chemical weapons are highly lethal and disruptive, analytical tools to build a foundation are required for use in a research setting as well as an operational setting. In order to properly identify the chemical composition within these chemical agents, highly sensitive and rapid measurements need to be taken for proper analysis and observation.

In a study presented by Snyder (2019), he claims that using a single linear quadrupole ion trap to acquire two-dimensional mass spectrometry data (2D MS/MS) is highly suitable for this process (p. 1). The 2D MS/MS process provides a time and sample efficient method to obtain chemical signature readings for targeted mass-to-charge ratios. "Two dimensional MS/MS scans are accomplished in a linear ion trap by fragmenting precursor ions via collision-induced association in one radial dimension with an AC frequency sweep while a broadband waveform is applied in the orthogonal dimension to eject product ions when they are formed" (p. 4). Through these scans, an efficient alternative to experimentation via data-dependent MS-MS using superfluous mass spectrometers is achieved.

The experimentation resulted in four different V-series chemical warfare agents being tested using LTQ-MS. The experiments displayed that each domain consisting of mass-to-charge ratio were distinguishable and unique. It proved most effective when the sample amount of a highly constraining factor, as it may be in chemical signature analysis.

Miniature Mass Spectrometers

Mass spectrometry and the associated systems to perform its functions have long been improved over time. Similar to any technology, the system becomes efficient, streamlined, and performance improves substantially. In a paper from Snyder, Pulliam, Zheng, and Cooks (2016), the advances in miniature and fieldable mass spectrometers are discussed. The discussion focuses on delivering a mass spectrometer that is small, fast, robust, and offers on-site analysis as needed.

The main focus for a mass spectrometer is the performance and output delivered. "The resolution should be sufficient (usually unit) to separate analyte ions from other components, and the sensitivity and selectivity ought to be appropriate for the intended measurement. High sensitivity and specificity are expected characteristics, leading to low detection and quantitation limits for particular analytes" (Snyder et. al., 2016, p. 1-2). In order to harness these capabilities, the overhead must be reduced to achieve expected performance. Snyder et. al. suggests that that samples upon being interpreted by the MS should not be purified and take place directly on site (2016, p. 2). This is regardless of the sample's composition, phase, or complexity.

In order to achieve these results within a portable MS system, a combination of ambient ionization and tandem mass spectrometry should be implemented (2016, p. 2). As the samples are interpreted, they must be ionized and transported from the ambient environment to the mass analyzer. Through the use of ambient ionization, the sample is ionized in the natural state without prior alterations. A form of ambient ionization includes desorption atmospheric pressure chemical ionization (DAPCI). "DAPCI is another plasma method in which a high DC voltage is applied to a sharp needle, producing a corona discharge which is then carried to the sample by gas flow" (2016, p. 3). This method allows for the sample to undergo charge transfer reactions, which causes the analytes to ionize. A recent DAPCI probe was developed weighing only 0.6 kg and not requiring a solvent or gas cylinder for use (2016, p. 3).

In order to analyze the ionized analytes, a powerful and efficient mass analyzer is required. In Section 2.2.2, a quadrupole filter ion trap mass spectrometer is discussed for use in reading specified mass-to-charge ratios that may appear. "The favored mass analyzers for miniature mass spectrometers are ion traps" (2016, p. 7). Ion traps present both advantages and disadvantages to a miniaturized mass spectrometer. Advantages may include the ability to use lower voltages for mass-analysis resulting in power savings, resolution is improved at higher pressures, and the trap has inherent tandem mass spectrometry (MS/MS) capabilities to add specificity to the readings (2016, p. 7). Disadvantages include fewer ions can be trapped due to space charge and parameters such as RF frequency may be restricted base on physical limitations such as a power source (2016, p. 7).

Different types of trapping mechanisms may be used to improve the trapping efficiency within a miniaturized mass spectrometer. An example may be linear ion traps. "Linear traps are devices which have quadrupole fields in two dimensions and a simple trapping field in the third. They offer increased trapping capacity along with a significantly improved trapping efficiency upon ion injection. As such, they have become very common mass analyzers in instruments of all sizes, including small systems" (2016, p. 7-8). A linear ion trap is an effective technique to capture a greater number of ions from the sample for interpretation, especially in a smaller device.

The presented solutions including DAPCI and linear ion traps are both found in miniaturized mass spectrometers. Through these capabilities, predictive failure may be identified within a larger electronic system via chemical detection. The chemical detection may search for abnormalities or chemicals found that indicate a failure or fault has taken place. This may be usable for FDD given the proper processing power, power source, and size.

Atmospheric Pressure Chemical Ionization

Figure 3:
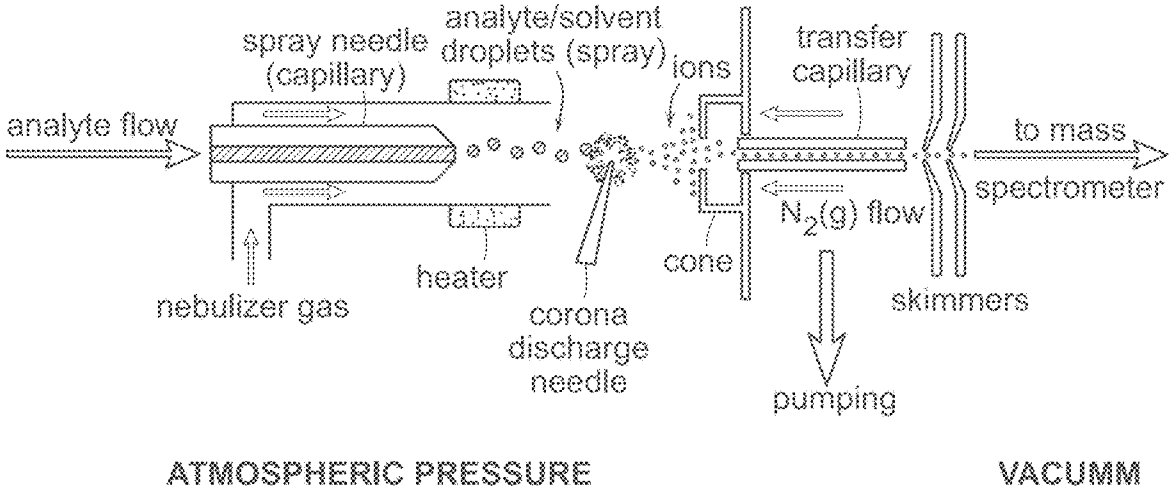
FIG. 3 shows the Atmosphere Pressure Chemical Ionization (APCI) process.

Atmospheric Pressure Chemical Ionization (APCI) is an ionization method used in mass spectrometry. The method allows for the ability to easily ionize and detect sensitive molecular weight information. The weight information gathered may be further extrapolated for use to identify the structural composition as well. FIG. 3 depicts the basic process of APCI with mass spectrometry (Gates, 2014, n.p.).

The process can be interpreted as follows:

1) Analyte solution is introduced into a pneumatic nebulizer and dissolved in a heated quartz tube before interacting with the corona discharge
2) The corona discharge replaces the electron filament in chemical ionization and produced primary Nitrogen ions by electron ionization
3) Primary ions collide with the vaporized solvent molecules to form secondary reactant gas ions
4) Reactant gas ions undergo repeated collisions with the analyte resulting in formation of analyte ions
5) The collisions result in high ionization efficiency and thermalization of analyte ions
6) The results in predominantly molecular species and adduct ions with very little fragmentation
7) Once formed, the ions enter the pumping and focusing stage as other ion sources (i.e. discharge from Raspberry Pi) for interpretation by the mass spectrometer (Gates, 2014, n.p.).

The process presents an enhanced method to produce charged ions and reduced fragmentation within the resulting ions in comparison to other ionization methods such as electron ionization (EI).

When used in conjunction with mass spectrometry, APCI can present as a preferred method to other ionization types. "APCI can be an attractive alternative to EI (less fragmentation) and CI (more universal). In MS/MS, because of the reduced fragmentation when using APCI, the selection of the precursor ion no longer a compromise between selectivity and sensitivity" (Portoles et. al., 2012, p. 9803). Through APCI-MS, multiple sources have become commercially available to harbor these benefits to include versatility, enhanced analytical capabilities, and application toward different industries. Taking these sources into account, multiple research and development projects are pursued using this method.

APCI-MS is applied across both liquid and gas sample analysis. For gas-sample analysis specifically, it "has been used in a number of areas including exhalation in medical application, food flavor classification, volatile organic compound (VOC) and biogenic VOC detection, and chemical warfare agent monitoring" (Zhang et. al., 2019, p. 5716). With multiple uses to include lethal weapon identification to general food classification, APCI-MS is a universal method in determining chemical composition and structure across certain signatures collected. The method proves useful for experimentation involved with the collection of gases, or a differentiation in states within an experiment, to collect and interpret the chemical signature.

Positive and Negatively Charged Ion Methods

In a paper from Robert Large and Hans Knof (1976), they discuss the comparison between negative and positive ion mass spectrometry. Negative ion mass spectrometry was commonly overlooked due to use of positive ionization methods. Reasons included the inherent low and structure dependent sensitivity for negative ions relative to these positive ions as well as the dependent on electron beam energy (Large & Knof, 1976, p. 2). In the 21st century, a common method of negative ion formation results from electron attachment or proton removal as noted prior. From experimental research and testing, "negative ion mass spectrometry is clearly a 'selective' low energy ionization technique. The list of compounds producing intense negative peaks include polar compounds, such as alcohols and acids, which are difficult to analyze other techniques" (1976, p. 17-18). As negative ions may be useful for polar compounds, the positive ionization technique is used for more non-polar compounds. Both are commonly used in current MS studies pursued and provide useful information for use in interpreting spectrums produced.

The ionization method for samples read in by the mass spectrometer may differ as the sample gives up or accepts a charge or other matter. Ionization methods typically generate both positively charged and negatively charged outputs for interpretation. In a presentation from the University of Maryland (2009), the method of adding or removing a charge from a sample is reviewed. "Protonation is a method of ionization by which a proton is added to a molecule, producing a net positive charge of 1+ for every proton added" ("Sample Ionization Mechanisms", 2009, p. 4). In addition, "Deprotonation is an ionization method by which the net negative charge of 1—is achieved through the removal of a proton from a molecule" (2009, p. 5).

Protonation and deprotonation are both used to charge the sample and create an ion, which differs from the compound (sample) analyzed.

The chemical differences between the sample and resulting ion occurs in the molecular weight and charge. In the ionization method, the donation or removal of the proton adds or subtracts a mass number from the compound analyzed. Upon interpretation of the spectrum, the ions associated with high intensities may have mass-to-charge ratios that may determine the compound analyzed if unknown initially. By adding or subtracting a m/z of one from the identified m/z for the ion, the compound may be found. The chemistry differences in the compound from the resulting ions can be analyzed to see how the base chemistry of the molecule ionizes.

Raspberry Pis as a Testing Medium

Figure 4:
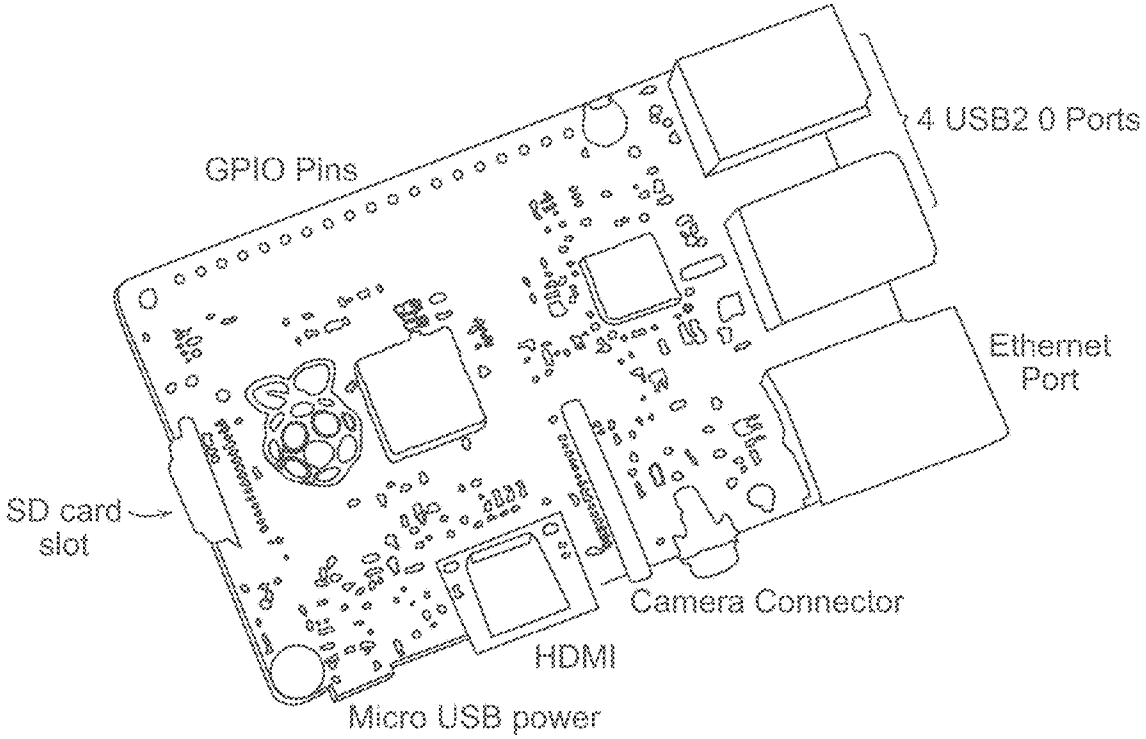
FIG. 4 shows a Raspberry Pi B+ board configuration.

A Raspberry Pi is a small computing device used to automate certain processes and tasks. Multiple tests have been performed using a RP as a unit of testing. Tests are mainly involved in computing tests for processing and automation, however, Raspberry Pis serve multiple purposes. According to Vamsikrishna, Kumar, Hussan, and Naidu (2015), a "Raspberry Pi is a credit card sized single board computer with an ARM11 microprocessor" (p. 1). As technology improves, multiple forms and versions of RPs have changed as well. The fundamental idea of a RP is a microcomputer with the ability to process and execute simple programs as instructed by the user and peripheral devices. FIG. 4 shows the basic components of an RP (Vamsikrishna, Kumar, Hussain, & Naidu, 2015, p. 1).

The figure notes the input and output (I/O) methods of the RP, which contains an SD card slot, HDMI source, Micro USB power, Ethernet port, USB 2.0 ports, and a camera connector. As multiple methods to connect and interact with the RP exist, the user can utilize it to perform a multitude of tasks.

As noted, the RP consists of multiple I/O methods and microelectronics that compose the system. Components listed above plus those mentioned in Section 2.1.1 to include the motherboard, central processing unit, the chipset, the random-access memory (RAM), the memory modules (hard drive), bus, storage drive, and ports all have varied failure modes. These failure modes can differ greatly due to the operational task of each component. Thus, the chemical output and detection method may differ for each failure or fault detected.

An article written by Fletcher and Mura (2019) notes the utility and versatility of RPs. It performs as an all-purpose computer which is cost-effective for the general consumer. As a RP proves to be a versatile tool, it is constantly used as a testing medium in scientific experiments. For the purpose of this research, it is a cost-effective tool which can be programmed to overclock, and essentially cause the RP to physically fail. Multiple RPs can be used and programmed to overclock in different methods to study the chemical signatures for possible areas of failure.

Generation of Chemical Signatures

The research consisted of an experimental quantitative study being performed. Empirical data was collected on the targeted power supply of the RP across different voltages via mass spectrometer readings to create chemical signature outputs. Through data collection, a non-invasive data collection method can be used by the DoD to better understand chemical signatures and the identification of failure in microelectronics. Through identification of the microelectronic failing, FDD methods can be implemented in conjunction to better monitor and maintain operational use of DoD systems and applications.

In order to validate this research through experimental design, three research questions must be addressed. These questions are framed to identify chemical signatures in microelectronics that can be used in conjunction with FDD techniques. First, what universal component across electronics may be targeted to determine a difference in signature readings? Each electronic system has common components or parts that may be targeted to represent chemical signatures that may be universal across multiple systems. Second, what chemical signatures can be detected? This will be accomplished by utilizing methods of MS and APCI to detect chemical signatures. The experimental unit will be tested at different states to determine any noteworthy difference between mass-to-charge peaks and overall signature readings. Lastly, is there a representative spectral analysis associated with various chemical signatures that will indicate the type of fault? By identifying the chemical signatures associated with the microelectronic, a method can be developed to indicate the type of fault occurring within the system for modes of failure.

In order to answer question 1: common components within an electronic system need to be identified in order to determine the targeted area. Most electronic systems are computers or utilize a computer to operate it. Thus, common components of a computer are noted. In an article from Houk Consulting (2017), the most common components include the motherboard, power supply, central processing unit, random-access memory, solid state drive, video card, optical drive, and input-output devices (n.p.). As each electronic system must have a power source, whether it is a direct connection or a battery, it must have power in order to operate. Thus, for simplicity and universality, the power supply will be targeted for experimentation as the component exists in multiple, if not all, electronic systems.

In order to answer question 2: chemical signature detection in systems and applications, RPs were used to simulate experiments. RPs were used as they represent the basic functionality and components within an electronic system. The RPs will be used as a testing medium to target a specific component within the system. As stated earlier in answering question 1, the power supply will be targeted. The power supply targeted will be tested at different voltages until a power surge occurs causing the power supply to fail. Once failure occurs, the power supply resonates gases which may differ from the normal operating state. For each RP, the following procedure was followed:

1. The RP is connected to a variable power supply.
2. The RP is placed under an APCI needle, positively or negatively charged based on the trial, to create the ion field.
3. Simultaneously, the RP is placed under Tygon tubing that is connected to the mass spectrometer inlet to suck the gases in for readings.
4. The variable power supply in conjunction with the mass spectrometer software and APCI power source are all started to begin the trial.
5. For each power voltage at 5V, 7V, 9V, and 11V respectively, 25 scans by the mass spectrometer are taken at the operational voltage. According to the Raspberry Pi documentation, the default power supply is 5.1V, thus the experiment starting at 5V.
6. From the scans, the mass spectrometer interprets the mass to charge ratios and creates chemical signature graphics using a computer-aided program.
7. The chemical signatures are studied for further interpretation to determine distinct differences and variability between normal state and failure.

Figure 5:
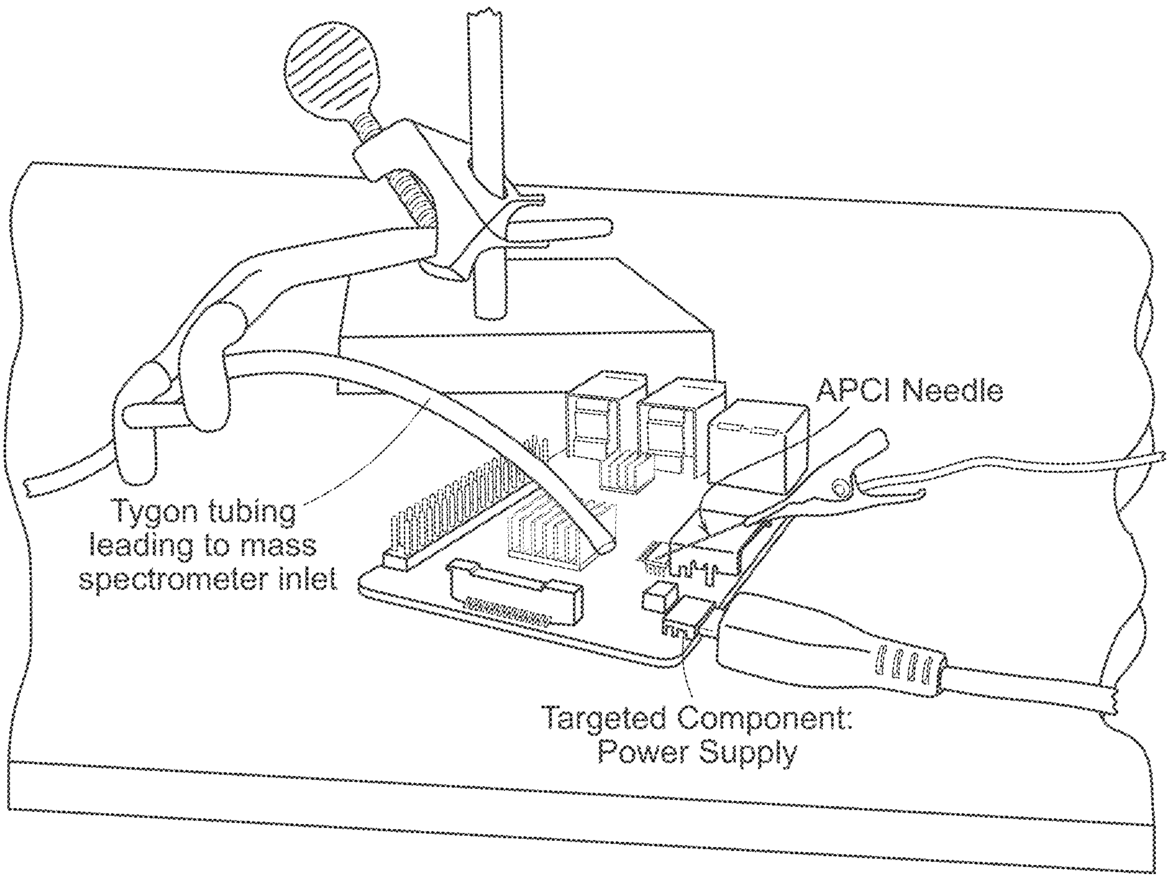
FIG. 5 shows an experimental setup for Raspberry Pi, APCI Needle, and Tygon Tubing.

In FIG. 5, the experimental setup can be seen for a RP with the associated APCI needle and Tygon tubing. The RP provides the ability for multiple to be tested due to the versatile utility and low cost. Through this process, APCI-MS provides a graphic to analyze the chemicals being detected during the failure of the system and the representative signature that is created. After the successful answering of questions 1 and 2, question 3 can be addressed: determining the representative spectral analysis for specific chemical signatures. As multiple samples are taken of the RPs being energized and caused to fail via the power supply, the signatures generated will have differing mass-to-charge ratios between normal voltage operations throughout failure of the RP during the voltage steps. The graphics will note chemical signature changes over time. Through noting the changes, the point of failure may be identified in the power supply for a RP which may translate to a larger system. The findings may better improve fault or failure point detection within a power supply through the representative chemical signature of normal operational state versus a failed state.

All of the experimentation documented above will be completed within a control group and repeated multiple times. Through this process, the feasibility of determining whether chemical signature detection is possible to better assist in identifying faults within electronic systems.

Description of Population

The population utilized within this study is commercially available Raspberry Pi 2 computers. These RPs are cheap and readily available for purchase. For the purpose of this experimental study, the RPs were used as experimental units to overpower the power supply of the RP and cause it to fail. These RPs represent a cheap surrogate for a full, high cost computer in a key failure fault tree as similar types of failure occurred.

Sampling Method

The sampling method used in this study is a simple random sample. In addition, the sample is based on convenience. As the population of RPs are commercially available, they were purchased from a larger company.

Parameters

The parameters associated with this study are related to the population of all commercially available Raspberry Pi 2 computers. The normal operating voltage of the RP is used as the initial parameter, or normal state, to test operational use. In addition, the number of scans taken by the mass spectrometer for readings is a parameter used. The mean of values resulting from the mass spectrometer scans is a parameter used for plotting data and the resulting signatures.

Sample Size

The sample size used for this study will be based on the simple random sample. Four RPs were in order to facilitate the experiment. For further experimentation or trials, a greater number of RPs may be bought for a low cost to compare tests or target other microelectronics within the RP.

Variables

Variables include both independent and dependent. The independent variables in this study are the voltage steps used at 5V, 7V, 9V, and 11V respectively. Each RP trial has 4 independent voltages it was tested on. The values between 5-11V were chosen as the default factory voltage for operating a RP is 5.1 V, and upon pre-trial experimentation, failure for RPs was found at 9V. The 11V voltage represents a post-failure state similar to any other voltage tested thereafter. The dependent variable is the chemical signature and mass-to-charge ratio graphic formed based on the mass spectrometer readings. The graphic provides information on the differences between voltage steps and how this may indicate a failure occurring in the RP.

Treatment

As 4 different trials were conducted, the output of chemical signatures from each RP run till failure differ slightly. Dependent on atmospheric conditions and the RP itself, the treatments vary. For the purpose of this experimentation, 4 treatments resulted from the same, uniform procedure being used on each RP with similar atmospheric conditions and the same voltage steps used.

Development

In order to facilitate this experiment, atmospheric pressure chemical ionization-mass spectrometry was used in order to read and identify chemical signatures from the RP upon failure. The LTQ Linear Ion Trap Mass Spectrometer produced by Thermo Scientific is used for the APCI-MS procedure in order to obtain high sensitivity MS scans along with in-depth $MS^n$ capabilities (Thermo Scientific, n.d.).

Validity

As RPs were used as the test sample to perform experiments, a control measurement was taken at each trial at 5V to compare the failed state to a normal, operational state. The 5V step was tested similar to all other voltage steps, using the APCI-MS method. This comparison allowed for the chemical composition of the control at 5V to be compared to the failure state at higher voltage steps for the RPs to deem notable differences between the experimental data. As the instrument used provided the results, the same method was used throughout the entire experimental phase.

Utilization

The use of the Thermo Scientific LTQ Linear Ion Mass Spectrometer remained consistent between all experiments and samples tested. The instrument was used in conjunction with APCI methods to generate an electric field and read the ions emitted from the RP in various operational states dependent on the voltage steps. The process can be repeated for additional samples than the sample size noted in order to collect more data if deemed necessary for further experimentation.

For each procedure, the RP was placed within vicinity of the APCI needle and Tygon tubing as referenced FIG. 5. The proximity is important in order to ionize the emitted chemicals from the RP for readings by the MS procedure. Once the RP was turned on at the prescribed voltage step, the APCI-MS procedure began to read in the emitted and charged ions for interpretation. The mass-to-charge ratios were documented over 25 scans taken by the procedure at each voltage step. In order to ensure a uniform environment for each experimental trial, the machine was recalibrated, and the surrounding areas was cleaned before the next RP was tested.

Data Collection

Quantitative data was collected from this experimental study. Data includes the mass to charge ratios for RP emitted ions at given voltages. In addition, the data collected represents the full span MS procedure across mass-to-charge ratios in the assigned spectrum. As noted, the data collected and generated is an average of 25 rapid scans taken by computer-aided software. From the collection of this data, a comparison is done to the control voltage step procedure done for each trial to the resulting states after failure—7V, 9V, and 11V. The data collection and interpretation flow diagram can be referenced in FIG. 6.

Figure 6:
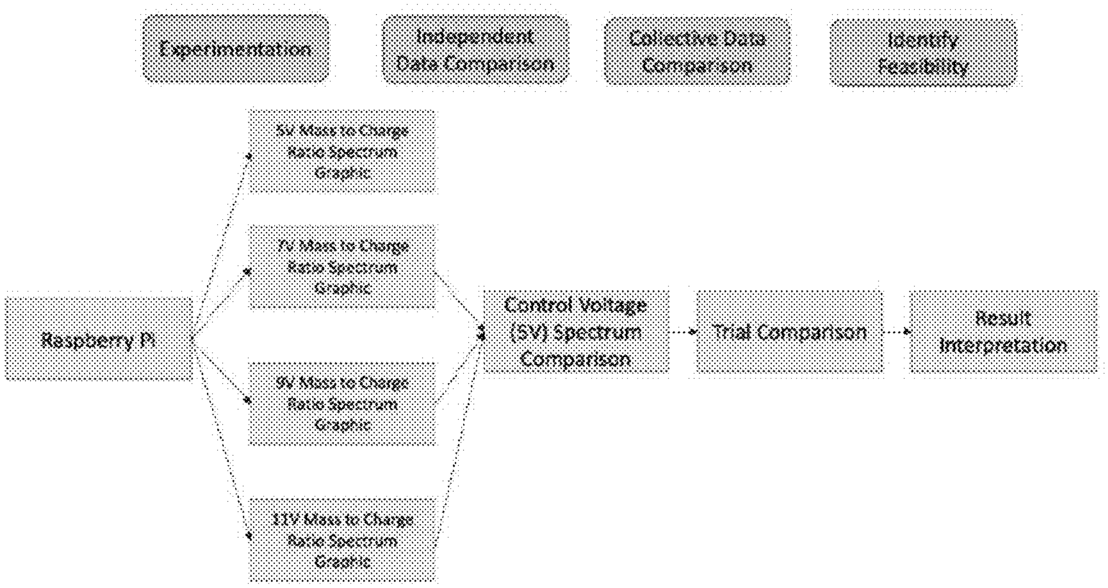
FIG. 6 shows flow chart of data collection and procedures.

Based on FIG. 6, the RP was used as an experimental unit for data collection. The experimentation started with voltage steps, as referenced, which output mass to charge data points to be graphically generated. For the independent trial, these graphics were compared to the control graphic for identifiable data points such as high concentrations associated with mass-to-charge peaks plotted. Once all trials finished, the graphics for similar voltages in independent trials were compared to assess similarity, as well as distinguish the common point of failure. Upon comparison of all trials, dependent on a positively or negatively ion procedure used, the results were interpreted to determine the feasibility of a non-invasive method of chemical failure detection.

As the data is quantitative, respondents and non-respondents are not accounted for in this study. In addition, no human subjects are used within this study.

Thermal Degradation and Bulk Sampling

The failure mode involved with this research focuses on thermal degradation within the electronic system. The excess voltage and power within the RP causes heat to be generated. This ultimately causes the RP to fail once the internal temperature threshold is surpassed. As heat is generated and built up within the system, the microelectronics and associated packaging are impacted. The heat vaporizes microelectronics components. As the temperature within the subsystem increased, off gassing occurs until degradation temperatures are exceeded in the insulation, packaging solder, or other finishing materials. As the vapor is sampled and ionized, gas phase ions are directly sampled in bulk with scanning the mass numbers in the sample stream. These ions directly correspond to the original chemical compounds. The APCI-MS method used to ionize the sample and interpret the readings is focused on the bulk sampling of data collected. As technology improves and changes with time, multiple changes within the chemical composure of a system may change to include the microelectronics and packaging. The variation tested may allow for the analysis of multiple failure origins as electronics change to include the components, packaging, and other materials.

The bulk sampling method used focuses on constant detection and monitoring of the electronic system. This focus results in trying to identify a general system change from the normal operational state. This process may be normalized upon the final product being manufactured and tested to determine the chemical detection and output at a normal state.

As the chemical detection process is implemented for FDD, the processing power will be harnessed from the electronic system itself. For example, the APCI-MS process can be intertwined in the miniature mass spectrometer. The processor can be used to perform the chemical analysis on samples collected by the MS device. This reduces the cost of putting in a backup processor, foregoes size and weight constraints, and allows for a FDD method to determine predictive failure.

APCI-MS Output and Extraction

For the purpose of this research, 4 independent trials were conducted—each trial was run at the same voltage steps to include 5V, 7V, 9V, and 11V. Of the 4 trials, 2 were done using positively charged ions, and the other 2 were done using negatively charged ions. All ions were generated via the electric field from the APCI procedure. During the trial, the computer-aided software collected and stored the mass spectrometer readings in hard drives.

For each trial, the RP was powered on at the respective voltage step, and the mass spectrometer readings began. The mass spectrometer collected 25 full scans representing the mass to charge ratios collected between 50 and 2000 and the respective intensities were recorded. Of these data points collected, the computer software averaged the 25 full scans and resulted in one averaged dataset of all the mass to charge ratios for the points collected. These averages were extrapolated to Excel. Each trial and the respective voltage step were treated individually utilizing the same method as described.

Each dataset resulted in over 20,000 data points collected. Multiple had a null value for the mass to charge ratio but were still used to identify significant differences between voltage steps per trial, as well as independent trial comparison. Table 4.1 provides the averaged output for the data points in Positive Trial 1 at the 5V step.

TABLE 4.1

Positive Trial 1 - 5 V - Averaged Mass to Charge Ratio Data

| Datapoint | Mass | Intensity |
|---|---|---|
| 1 | 50.09091 | 0 |
| 2 | 50.18182 | 0 |
| 3 | 50.27273 | 0 |
| 4 | 50.36364 | 0 |
| 5 | 50.45455 | 0 |
| ... | ... | |
| 21446 | 1999.636 | 0 |
| 21447 | 1999.727 | 0 |
| 21448 | 1999.818 | 0 |
| 21449 | 1999.909 | 0 |
| 21450 | 2000 | 0 |

Table 4.1 depicts the data sets for 10 points shown from 1 to 21450. The entire dataset is not shown due to the large size. As noted, multiple data points had a null value for intensity as the mass spectrometer did not read any such value for the identifiable mass to charge ratio. For the other voltage steps, and independent trials, the data follows a similar format. Differentiations occurred within the number of data points collected and the significant mass to charge ratios identified per trial.

Data Interpretation

The datasets collected for each trial and the respective voltage steps were interpreted via Excel and OriginPro—a graphing software. The full MS scans taken are difficult to interpret in the table format as portrayed in Table 4.1, thus graphic visualizations are used. With these visuals, the significant mass to charge ratios were easily identifiable based on peaks and higher intensities shown on the graph. Through these findings, a comparison occurred between the independent trials and voltage steps to note relevant differences. The comparison allowed for the data to signify a difference between normal state of operation and failure within the trials as the voltage steps increased, as well as comparing the independent trials relevant to one another for similar findings and visualizations produced.

Positive Ion—Voltage Step Trials

Two positively charged ion trials to identify failure in an RP were conducted. The voltage step process was followed, resulting in 4 voltages tested (5V, 7V, 9V, 11V). The voltage step outputs per trial can be seen in FIG. 7-14 below. The trials were run in the same atmospheric conditions and yielded similar results.

Figure 7:
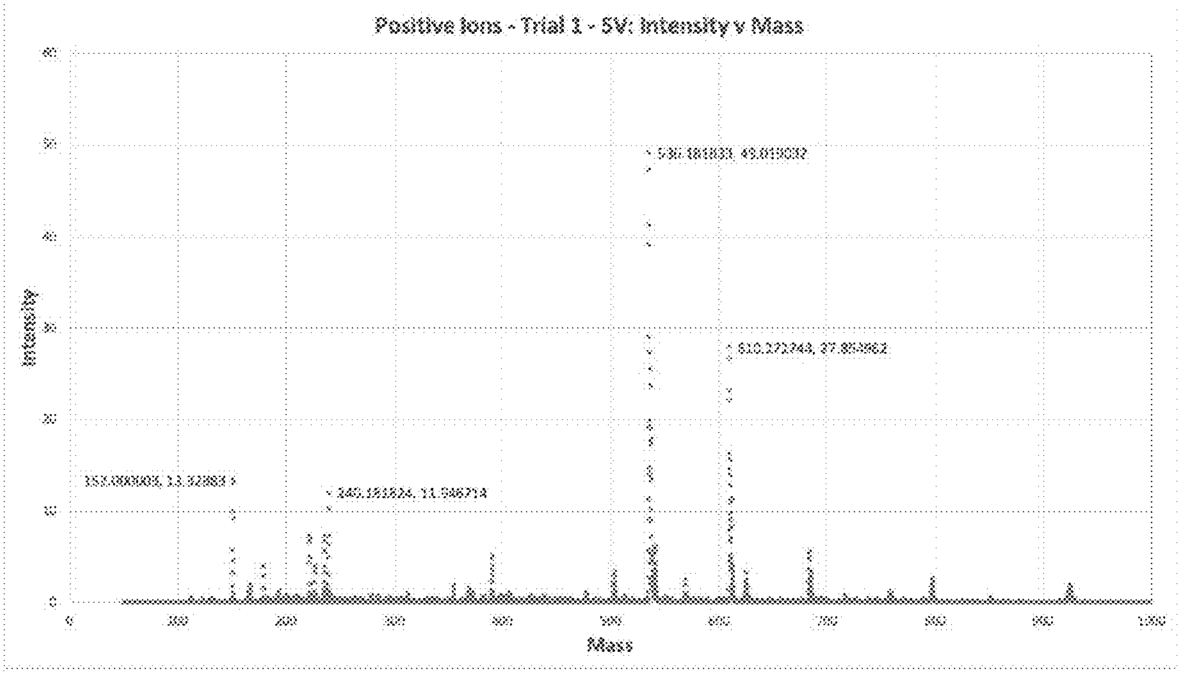
FIG. 7 is a plot showing Positive Trial 1—Chemical Signature Readings—5V.
Figure 8:
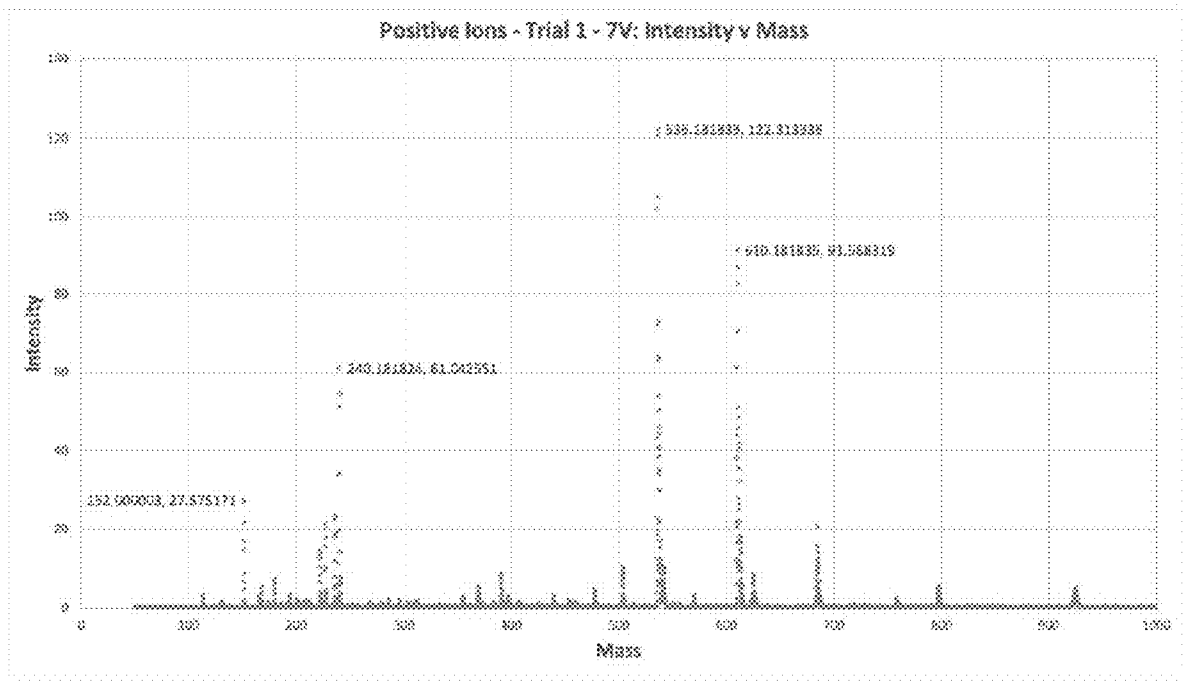
FIG. 8 is a plot showing Positive Trial 1—Chemical Signature Readings—7V.
Figure 9:
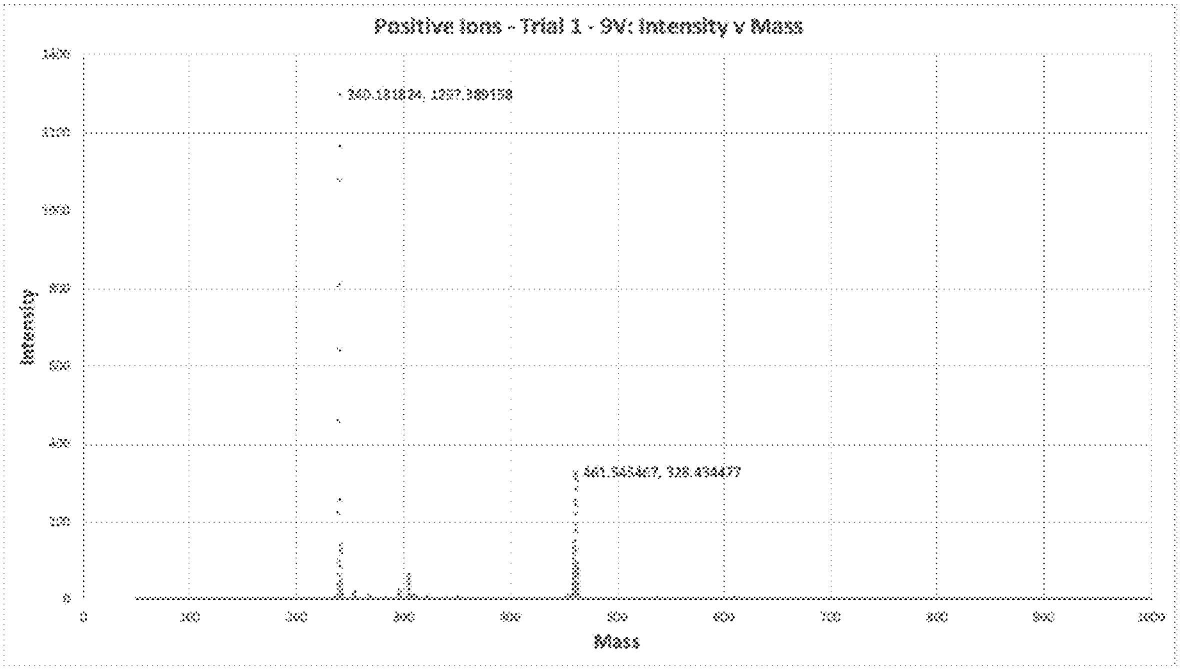
FIG. 9 is a plot showing Positive Trial 1—Chemical Signature Readings—9V.
Figure 10:
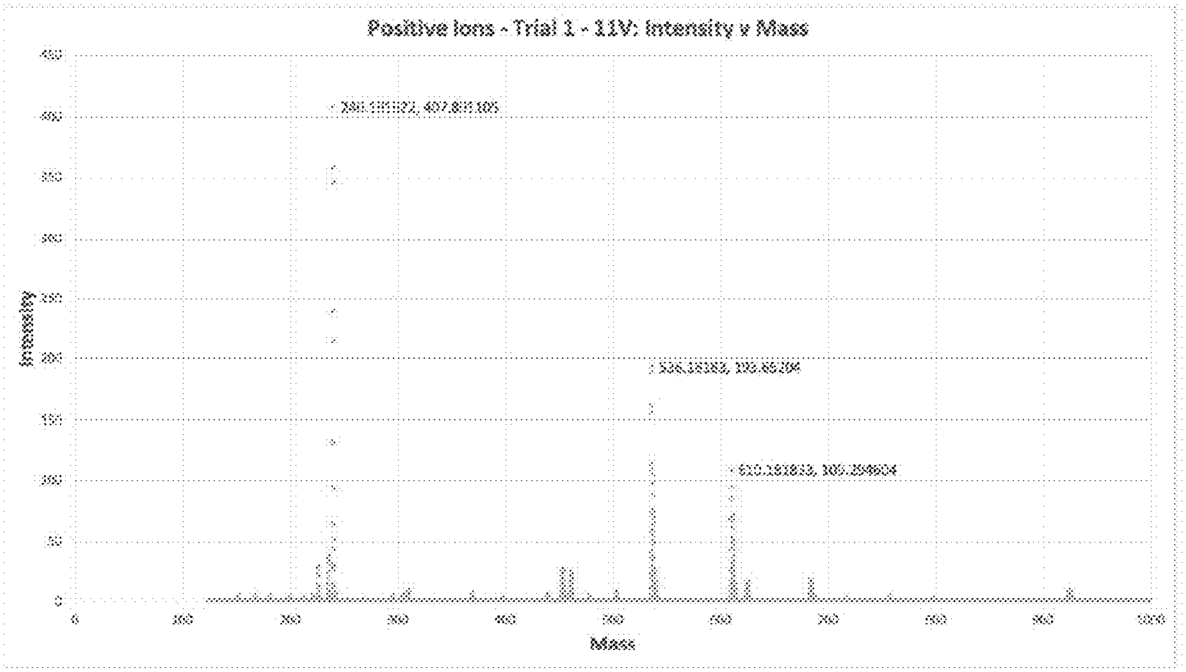
FIG. 10 is a plot showing Positive Trial 1—Chemical Signature Readings—11V.

FIGS. 7-10 display the voltage step signatures from Positive Trial 1. In FIG. 7, the signature for the 5V step for Positive Trial 1 is shown. The signature is plotted with the given mass-to-charge ratios and their respective intensities plotted. The intensities may vary based on the readings but signify distinctions within the plots in comparison with each voltage step. The documented peaks are shown as the significant points of interest that distinguish differences from the other voltage steps tested and plotted. The same is similar for FIG. 7-22 for the respective trials and steps tested. FIG. 8 shows the signature for the 7V step for Positive Trial 1. For the 5V and 7V steps, the chemical signatures appear extremely similar with slight variations. As per factory standards, the normal operational state of power for a RP is 5V. Upon completing the readings, and operating the RP at 7V, the RP continued to function normally without any change or failure indication. Thus, the signatures have similar outputs. For both the 5V (FIG. 7) and 7V (FIG. 8) signature, the major peaks appear at 152 m/z, 240 m/z, 536 m/z, and 610 m/z. FIG. 9 shows the signature for the 9V step for Positive Trial 1. Once the voltage step changed to 9V (FIG. 9), the chemical signature output differed greatly from the 5V and 7V steps. Failure took place during this voltage increase, and gases were emitted for reading by the mass spectrometer. As noted in FIG. 9, distinct peaks can be seen upon RP failure at 239 m/z and 461 m/z. FIG. 10 shows the signature for the 11V step for Positive Trial 1. The final voltage step at 11V (FIG. 10) represents a post-failure state. From FIG. 10, the peaks are at 240 m/z, 536 m/z, and 610 m/z. The differentiator within the 11V signature is 240 m/z from the normal operational state RP readings.

Figure 11:
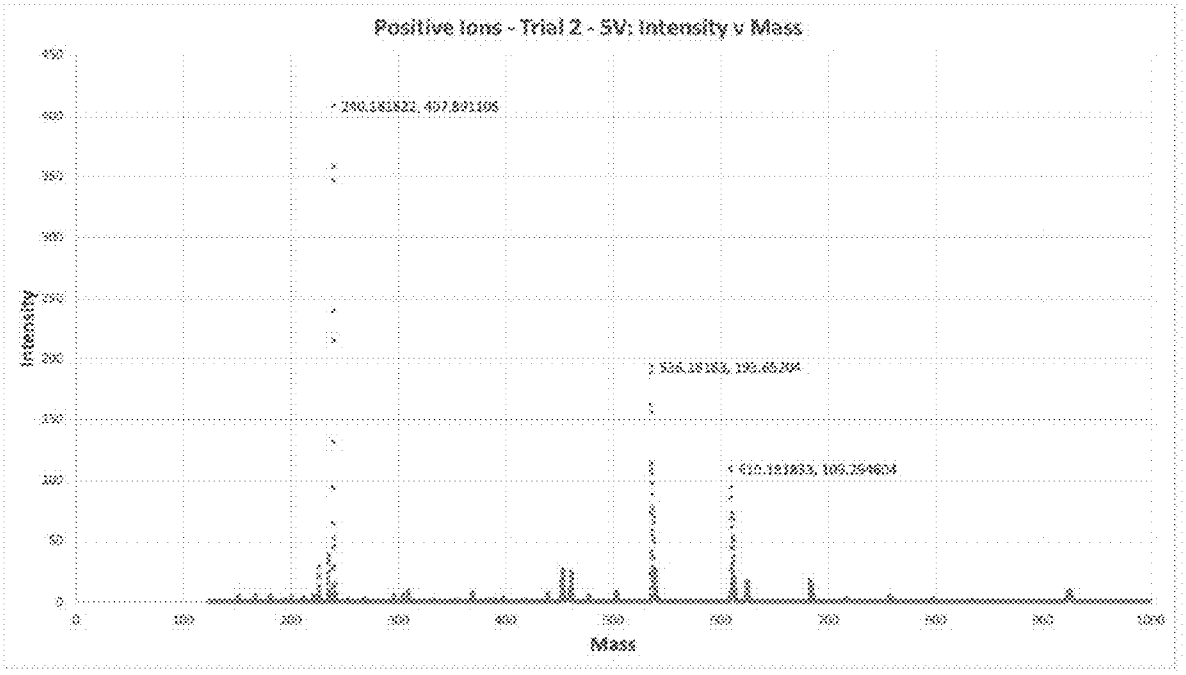
FIG. 11 is a plot showing Positive Trial 2—Chemical Signature Readings—5V.
Figure 12:
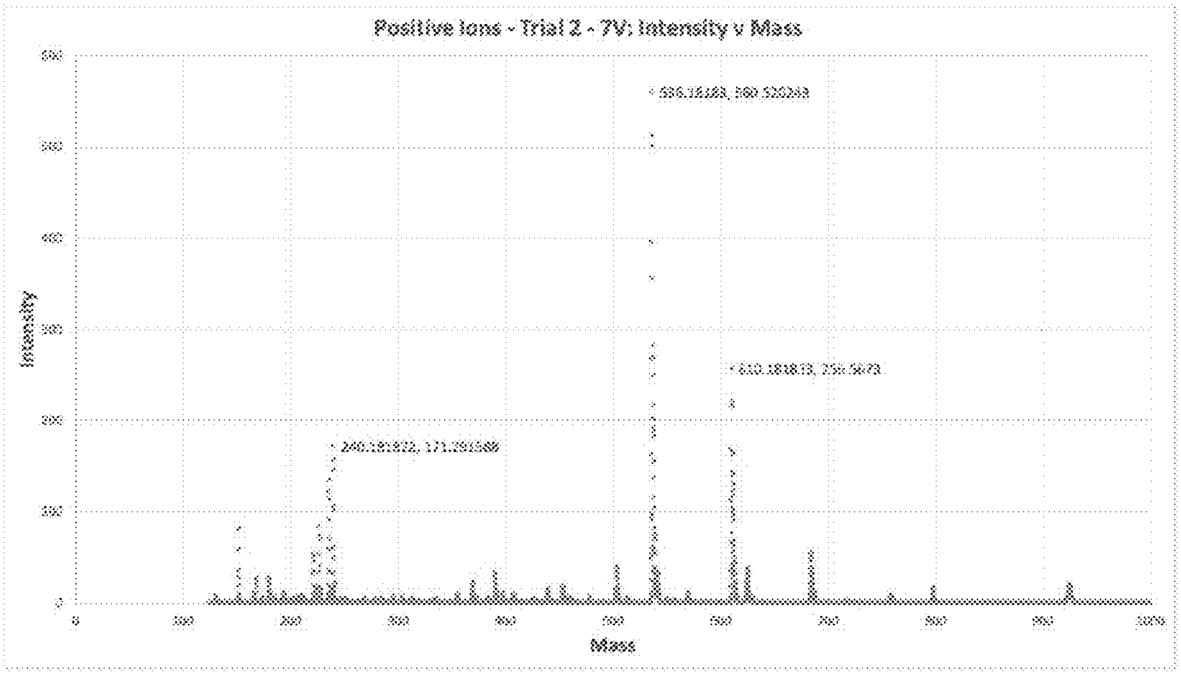
FIG. 12 is a plot showing Positive Trial 2—Chemical Signature Readings—7V.
Figure 13:
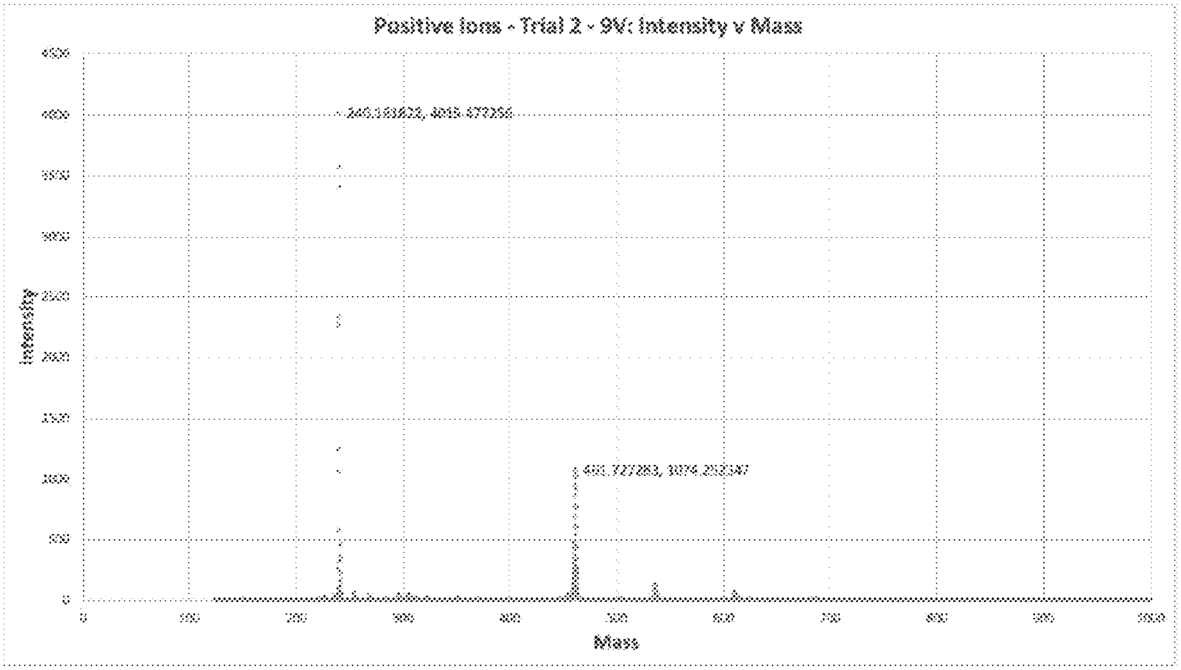
FIG. 13 is a plot showing Positive Trial 2—Chemical Signature Readings—9V.
Figure 14:
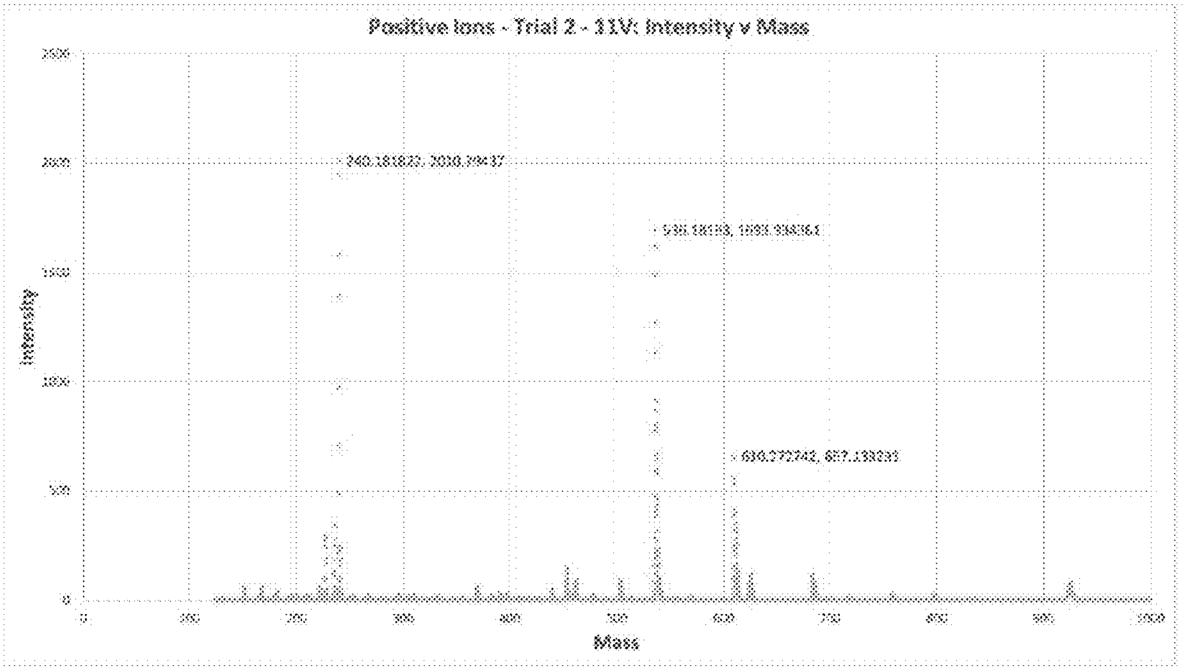
FIG. 14 is a plot showing Positive Trial 2—Chemical Signature Readings—11V.

FIGS. 11-14 display the voltage step signatures from Positive Trial 2. FIG. 11 shows the signature for the 5V step for Positive Trial 2. FIG. 12 shows the signature for the 7V step for Positive Trial 2. The 5V (FIG. 11) and 7V (FIG. 12) signatures are similar as noted for Positive Trial 2. From FIGS. 11-12, the peaks associated for 5V and 7V appear at 240 m/z, 536 m/z, and 610 m/z. FIG. 13 shows the signature for the 9V step for Positive Trial 2. Upon failure occurring at 9V (FIG. 13), the signature changed significantly. The peaks are at 240 m/z and 461 m/z with minimal activity readings across the signature. FIG. 14 shows the signature for the 11V step for Positive Trial 2. In the post-failure state at 11V (FIG. 12), the major peaks occurred at 240 m/z, 536 m/z, and 610 m/z with an increase in activity readings.

Negative Ion—Voltage Step Trials

Two negatively charged ion trials to identify failure in an RP were conducted. The voltage step process was followed, resulting in 4 voltages tested (5V, 7V, 9V, 11V). The voltage step outputs per trial can be seen in FIGS. 15-22 below. The trials were run in the same atmospheric conditions and yielded similar results.

Figure 15:
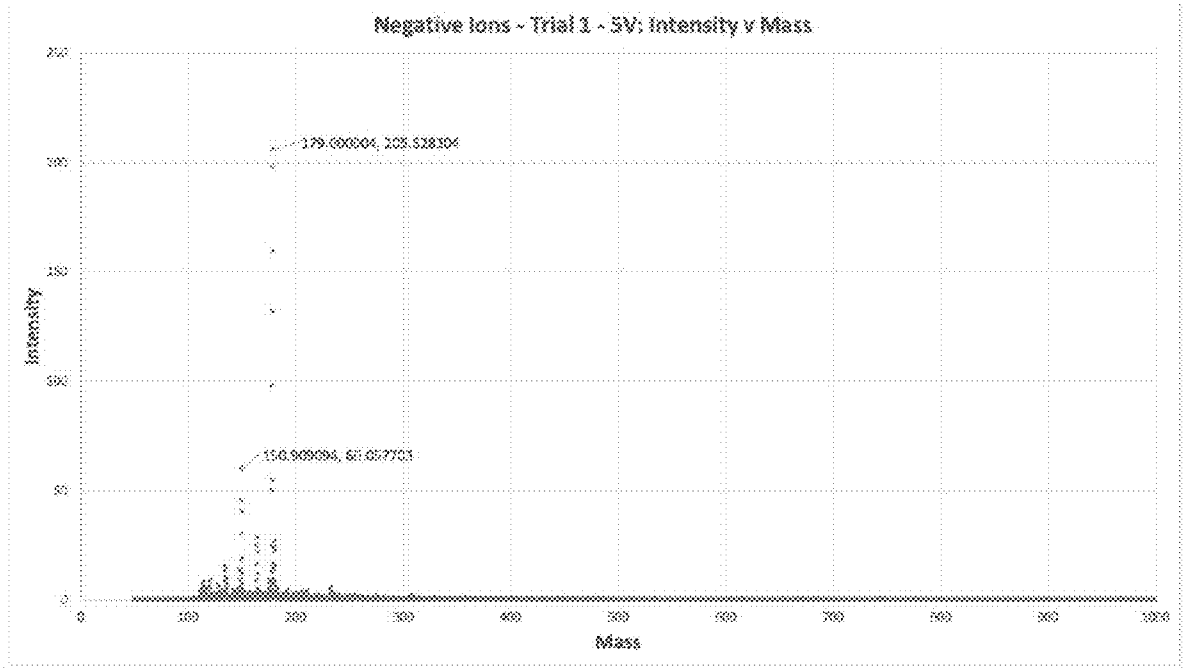
FIG. 15 is a plot showing Negative Trial 1—Chemical Signature Readings—5V.
Figure 16:
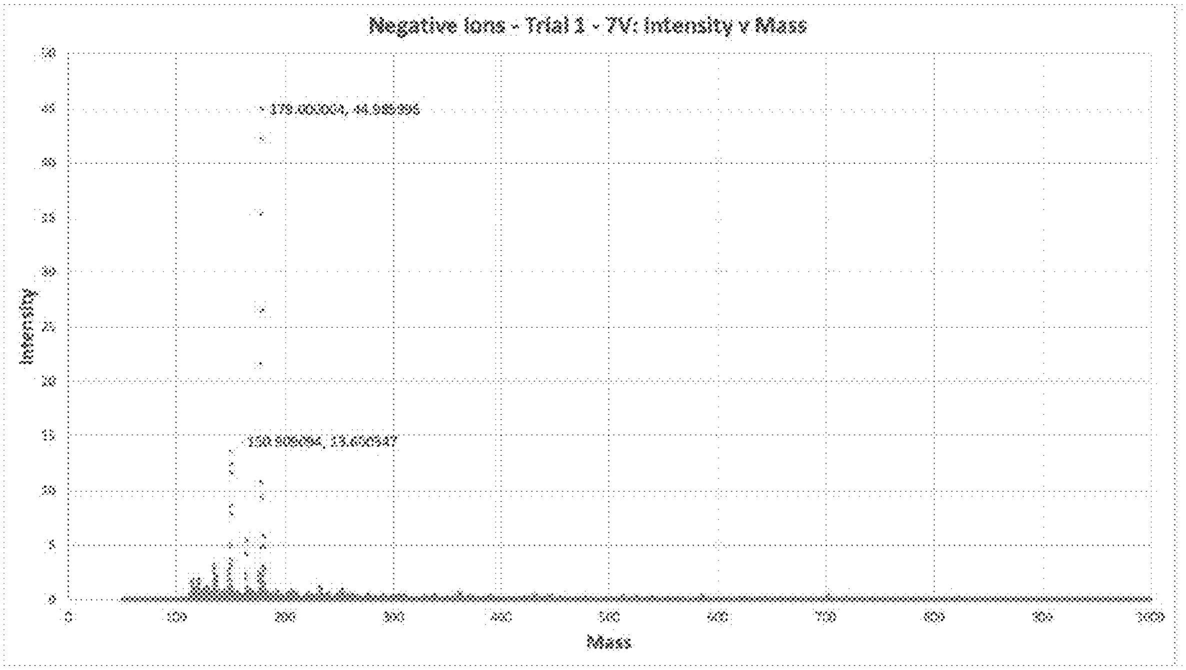
FIG. 16 is a plot showing Negative Trial 1—Chemical Signature Readings—7V.
Figure 17:
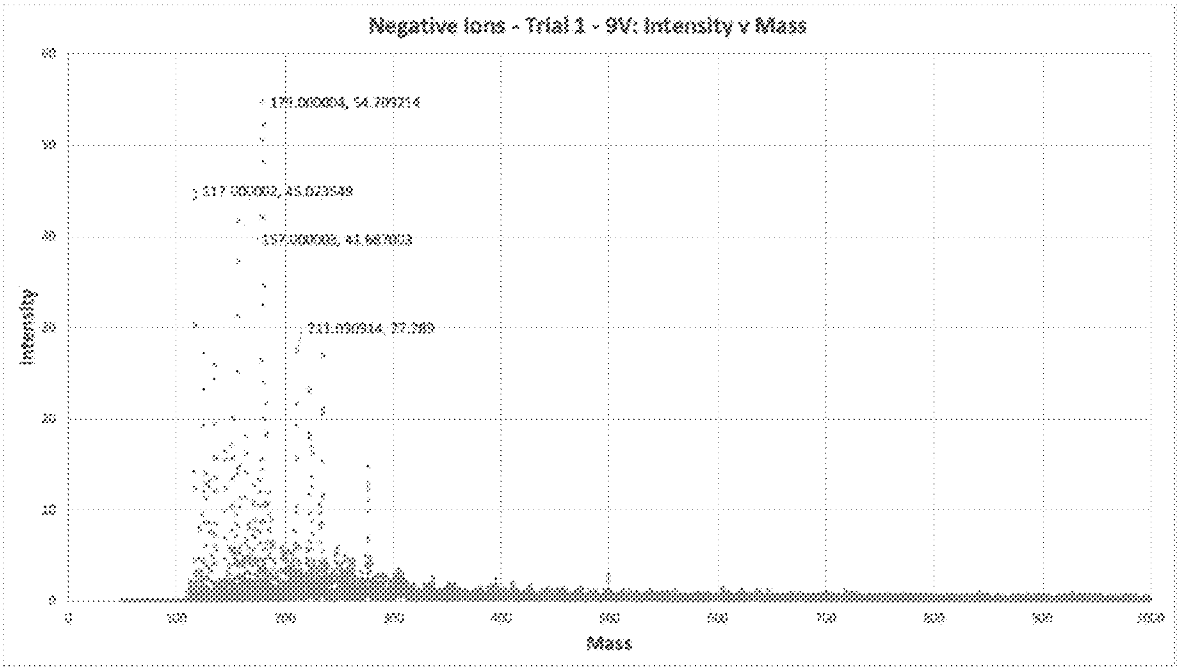
FIG. 17 is a plot showing Negative Trial 1—Chemical Signature Readings—9V.
Figure 18:
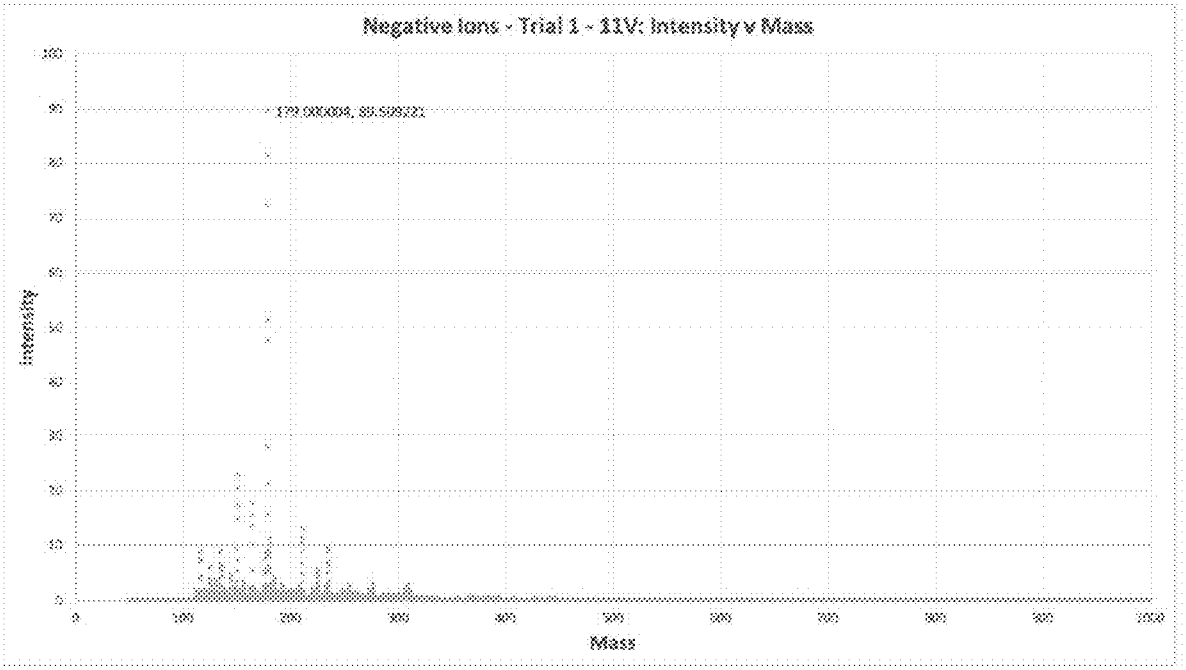
FIG. 18 is a plot showing Negative Trial 1—Chemical Signature Readings—11V.

FIGS. 15-18 display the voltage step signatures from Negative Trial 1. FIG. 15 shows the signature for the 5V step for Negative Trial 1. FIG. 16 shows the signature for the 7V step for Negative Trial 1. For the 5V (FIG. 15) and 7V (FIG. 16) voltage steps, the RP is in a normal operational state. Due to a normal state, the RP signatures for 5V and 7V were extremely similar. The major peaks for these signatures occur at 151 m/z and 179 m/z. As the voltage step increased to 9V (FIG. 17), the signature differed greatly from the normal operational state. FIG. 17 shows the signature for the 9V step for Negative Trial 1. At 9V, the RP failed causing different gases to be emitted for interpretation. The major peaks for the 9V step occurred at 117 m/z, 157 m/z, 179 m/z, and 211 m/z. The distinct peaks at failure versus normal state are at 117 m/z, 157 m/z, and 211 m/z. In addition, there a lot more data points with intensity readings upon failure. FIG. 18 shows the signature for the 11V step for Negative Trial 1. The 11V (FIG. 18) step, representative of a post-failure state, had one major peak at 179 m/z with less activity than at failure.

Figure 19:
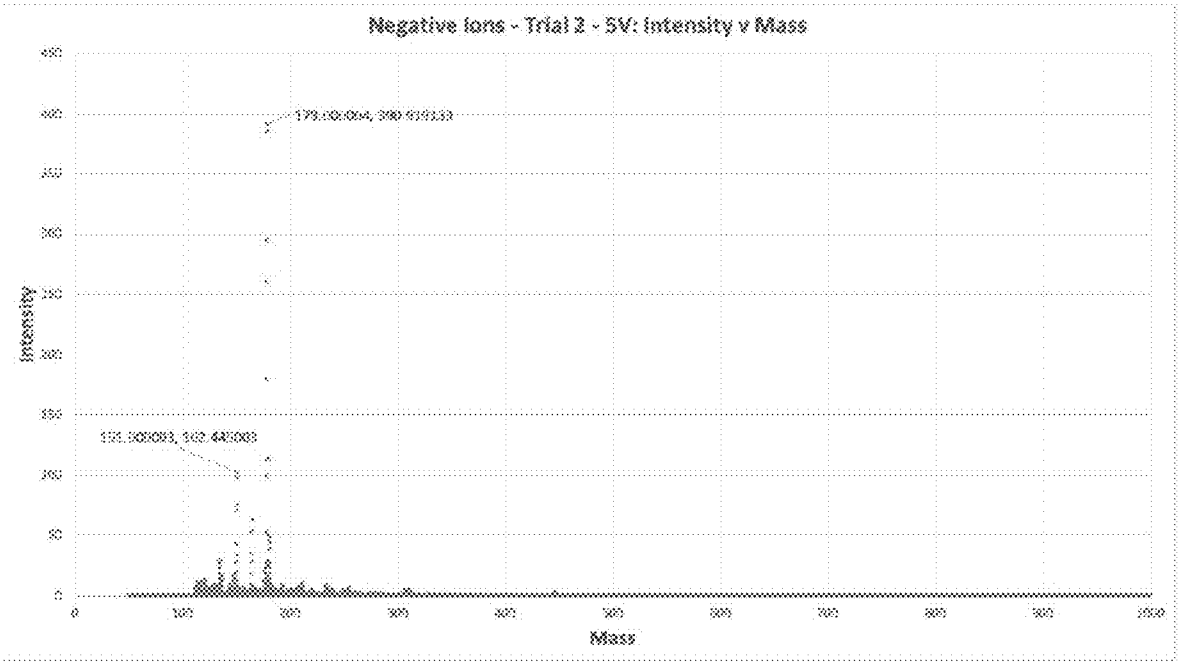
FIG. 19 is a plot showing Negative Trial 2—Chemical Signature Readings—5V.
Figure 20:
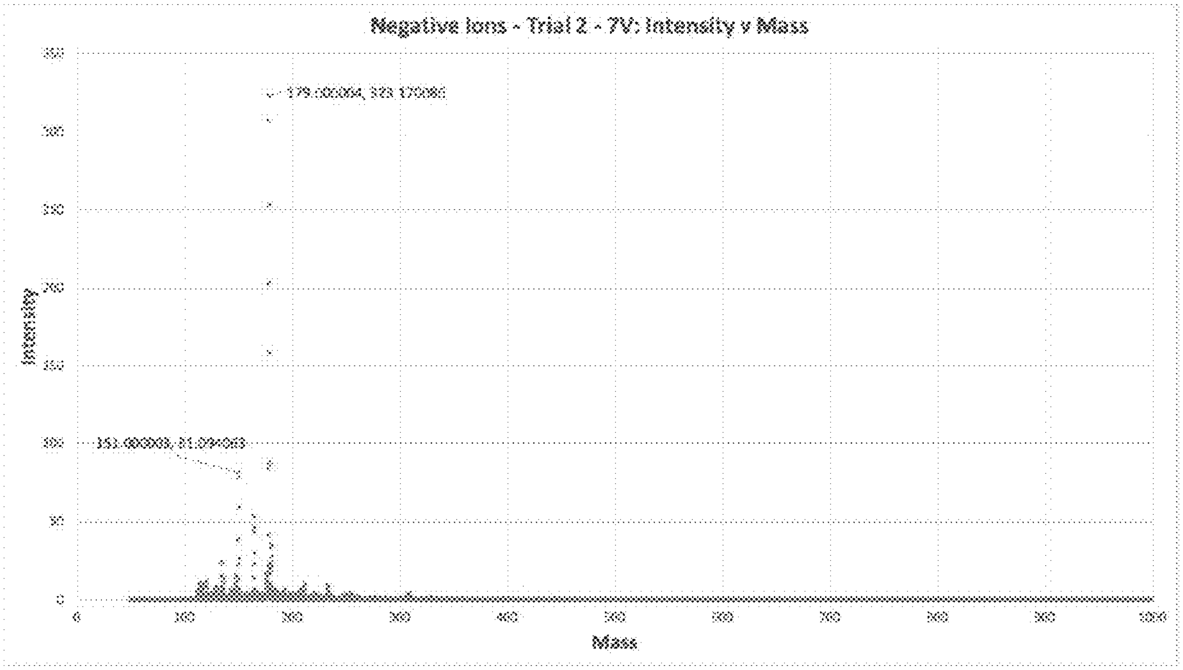
FIG. 20 is a plot showing Negative Trial 2—Chemical Signature Readings—7V.
Figure 21:
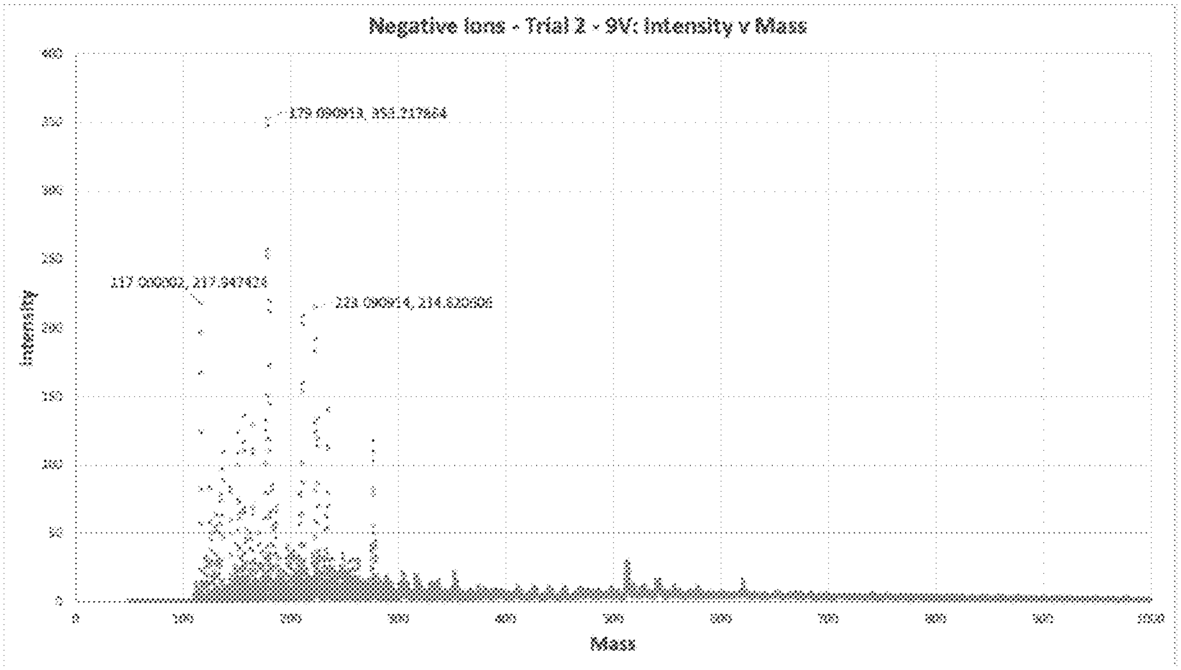
FIG. 21 is a plot showing Negative Trial 2—Chemical Signature Readings—9V.
Figure 22:
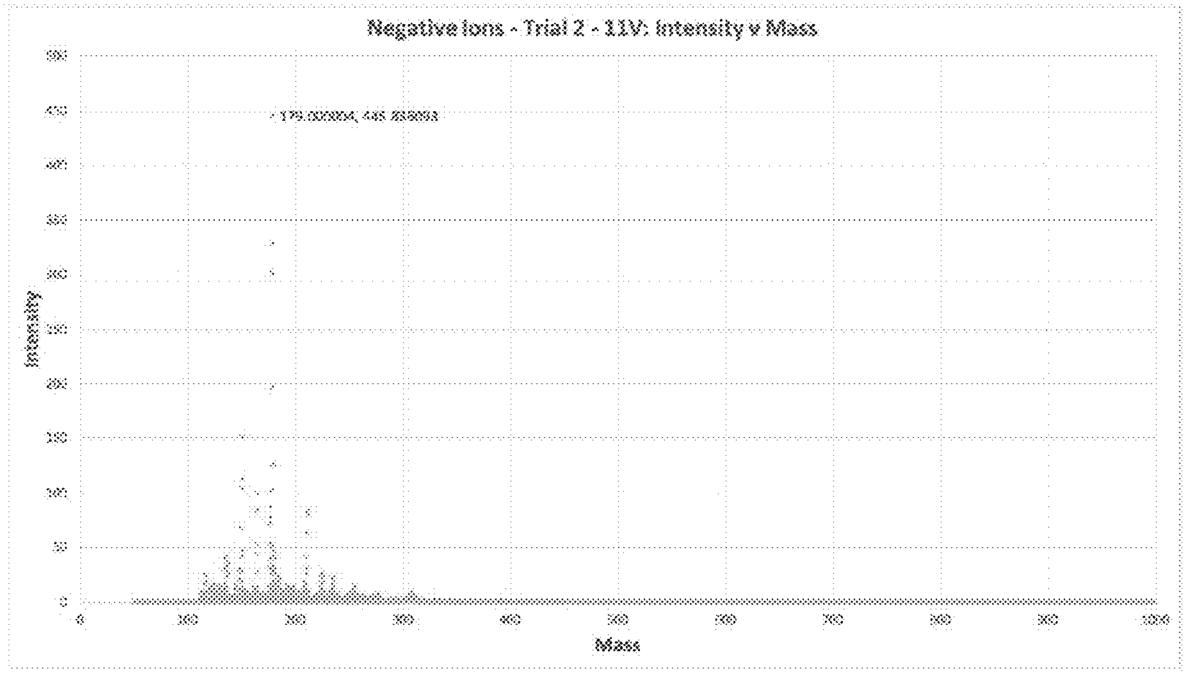
FIG. 22 is a plot showing Negative Trial 2—Chemical Signature Readings—11V.

FIGS. 19-22 displays the voltage step signatures from Negative Trial 2. FIG. 19 shows the signature for the 5V step for Negative Trial 2. FIG. 20 shows the signature for the 7V step for Negative Trial 2. The 5V (FIG. 19) and 7V (FIG. 20) step signatures are similar to the Negative Trial 1 signatures. The major peaks for the 5V and 7V steps occurred at 151 m/z and 179 m/z. FIG. 21 shows the signature for the 9V step for Negative Trial 2. Once the 9V (FIG. 21) step was tested, the RP reached failure causing an increase in intensity readings. In addition, a holistically different signature was output at 9V. The major peaks occurred at 117 m/z, 157 m/z, 179 m/z, and 211 m/z. FIG. 22 shows the signature for the 11V step for Negative Trial 2. The post-failure state at 11V (FIG. 22) recorded a peak at 179 m/z.

Positive Ion—Independent Trial Comparisons

Figure 23:
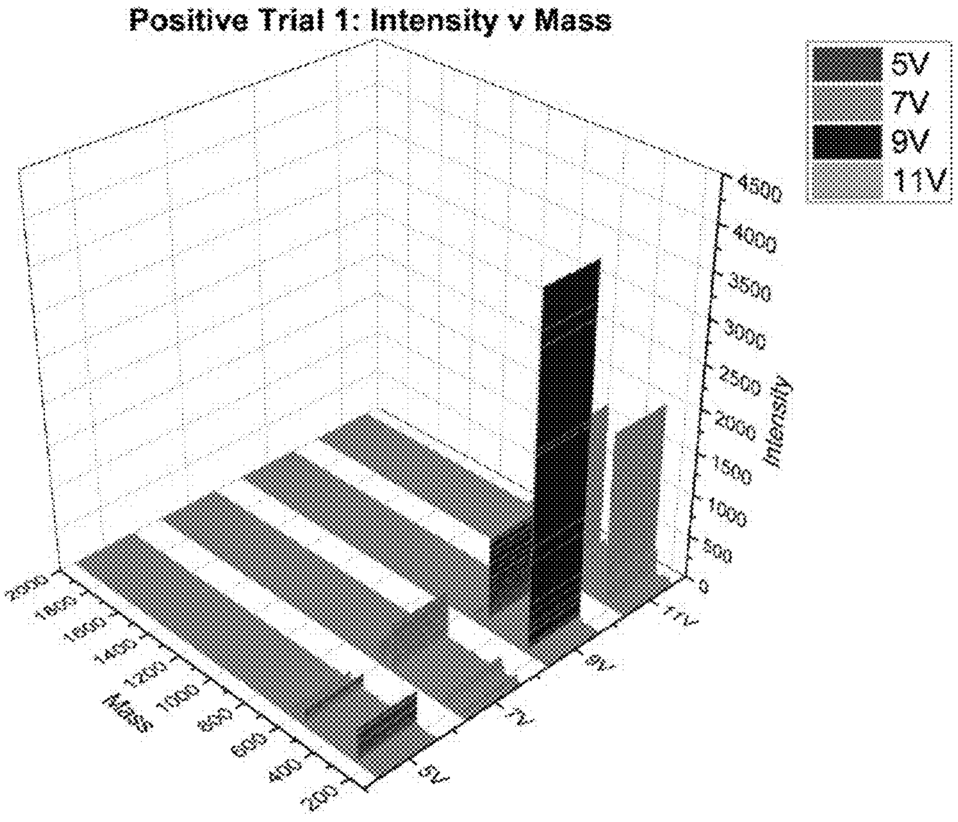
FIG. 23 is a chart showing Positive Trial 1—Side-by-Side Voltage Step Readings.
Figure 24:
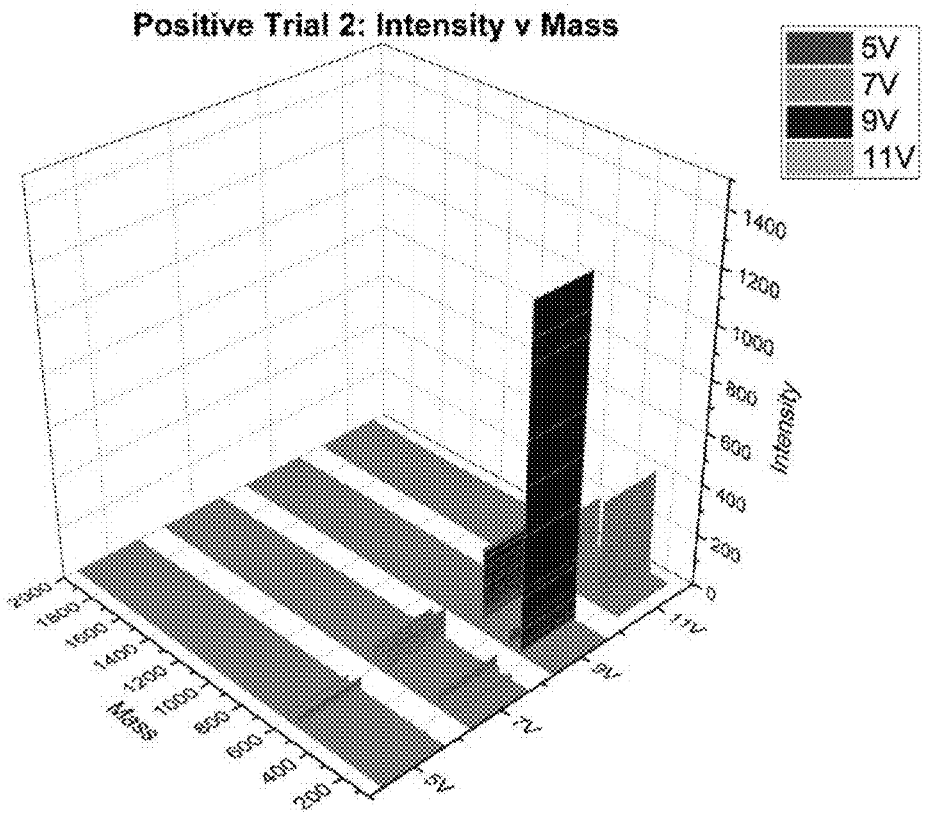
FIG. 24 is a chart showing Positive Trial 2—Side-by-Side Voltage Step Readings.

The positively charged ion trials yielded similar results based on the output signatures and peaks identified at each voltage step. As each trial executed resulted in similar mass-to-charge ratios recorded at each step, the reproducibility of experimentation is notable. Given the same experimental method is followed and the atmospheric conditions are constant, reproducible results can be seen if performed for multiple RPs targeting power supply failure. In FIGS. 23-24, the side-by-side comparisons of Positive Trials 1 & 2 are seen.

FIG. 23 shows the side-by-side voltage step signature comparisons for Positive Trial 1. In FIG. 23, the 4 voltage steps tested for the given trial are shown. The mass to charge ratios and given intensities are plotted for each step. This is similar to FIGS. 24-26. The intensity readings were generally high consisting from 0-4500 dependent on the mass and voltage tested. The readings greatly increased from 5-7V to 9V, post-power increase, which caused the RP to ultimately fail. The increase in activity, although lower than immediate failure at 9V, was higher at the post-failure state at 11V than the normal operational state from 5-7V. In addition, FIG. 24 shows the side-by-side step voltage step signature comparisons for Positive Trial 2. The intensity readings were lower than Positive Trial 1, having a range from 0-1400 recorded. However, similar trends were noticed between the two Positive Trials. Again, the intensity readings increased from normal operational state at 5-7V to the failure state at 9V. In addition, the readings were higher at the post-failure state of 11V.

Beyond the intensity patterns noted, both Positive Trials yielded similar results in the defining peaks. Table 4.2 displays the peaks identified for Positive Trial 1 & 2 at the given voltage steps. The peaks in Table 4.2 are based off the points labeled in FIGS. 7-14.

TABLE 4.2

Positive Trial 1 & 2 - Mass to Charge Peaks

| Voltage Step | Positive Trial 1 - m/z Peaks | Positive Trial 2 - m/z Peaks |
|---|---|---|
| 5 V | 152, 240, 536, 610 | 240, 536, 610 |
| 7 V | 152, 240, 536, 610 | 240, 536, 610 |
| 9 V | 240, 461 | 240, 461 |
| 11 V | 240, 536, 610 | 240, 536, 610 |

Based on Table 4.2, Positive Trials 1 and 2 yielded the almost all of the same peaks amongst their independent trials for 5V and 7V steps. When compared, the common peaks between Positive Trial 1 and 2 are at 240 m/z, 536 m/z and 610 m/z for 5V and 7V. For the failure state at 9V, the peaks were the same at 240 m/z and 461 m/z respectively. The same occurred for the post-failure state at 11V, with peaks at 240 m/z, 536 m/z, and 610 m/z.

Overall, the positively charged ion trials conducted produced extremely similar results and noted a considerable change in between normal operations versus a failed state based on the readings presented.

Negative Ion—Independent Trial Comparisons

Figure 25:
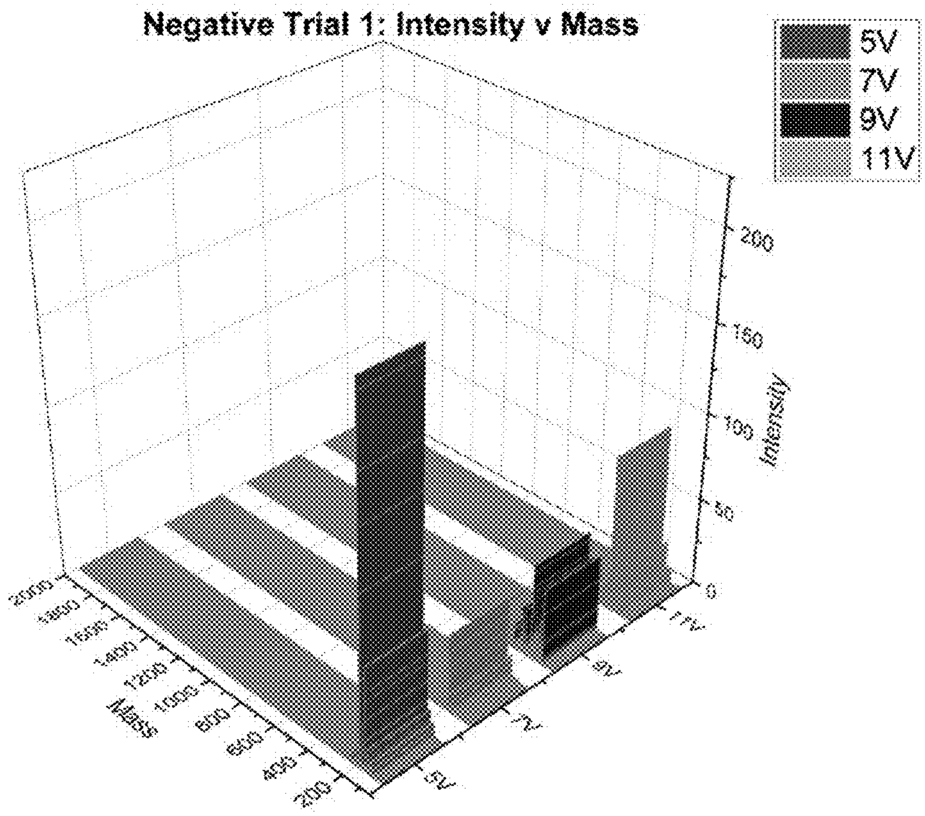
FIG. 25 is a chart showing Negative Trial 1—Side-by-Side Voltage Step Readings.
Figure 26:
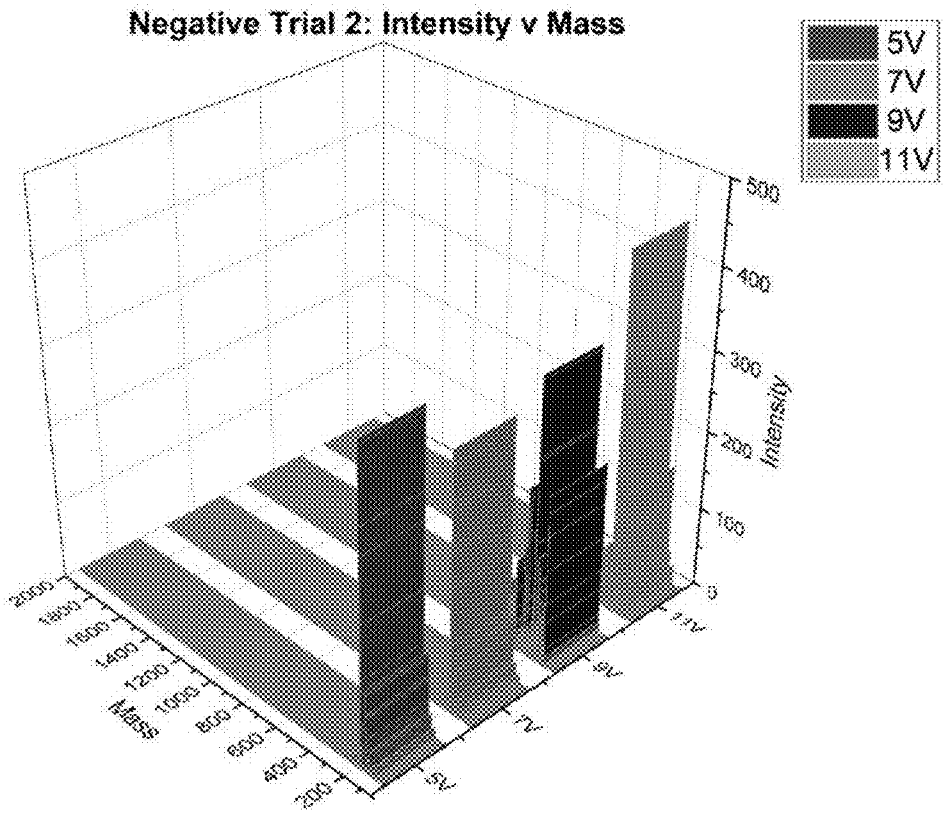
FIG. 26 is a chart showing Negative Trial 2—Side-by-Side Voltage Step Readings.

The negatively charged ion trials yielded similar results based on the output signatures and peaks identified at each voltage step. In FIGS. 25-26, the side-by-side comparisons of Negative Trials 1 & 2 are seen.

FIG. 25 depicts the side-by-side voltage step signature comparisons for Negative Trial 1. The intensity readings had a range between 0-200, dependent on the mass and voltage tested. Each voltage step had a great amount of activity readings across the signature; multiple intensities were returned with a non-zero value for the range from the 5V-11V range. In addition, FIG. 26 shows the side-by-side voltage step signature comparisons for Negative Trial 2. The intensity readings were higher than Negative Trial 1 with a range from 0-500. However, similar patterns were noted between Negative Trial 1 and 2. Similar to Negative Trial 1, Trial 2 had multiple intensities returned with non-zero values from the 5-11V range. Throughout the negatively charged ion trials, the overall signature had considerably more non-zero intensity values plotted than the positively charged ion trials.

Beyond the general ion patterns, both Negative Trials conducted yielded similar results for the defining peaks. Table 4.3 displays the peaks identified for Negative Trial 1 & 2 at the given voltage steps. The peaks in Table 4.3 are based off the points labeled in FIGS. 15-22.

TABLE 4.3

| Negative Trial 1 & 2 - Mass to Charge Peaks | | |
|---|---|---|
| Voltage Step | Negative Trial 1 - m/z Peaks | Negative Trial 2 - m/z Peaks |
| 5 V | 151, 179 | 151, 179 |
| 7 V | 151, 179 | 151, 179 |
| 9 V | 117, 157, 179, 211 | 117, 179, 223 |
| 11 V | 179 | 179 |

Based on Table 4.3, the same peaks were yielded for both Negative Trial 1 and 2 at voltage steps 5V, 7V, and 11V. However, a difference can be seen in the peaks produced upon the failure state at the 9V step for both trials. The common peaks between both Negative Trial 1 and 2 at 9V include 117 m/z and 179 m/z. The differentiating peaks for Negative Trial 1 were at 157 m/z and 211 m/z, which were different from the peak recorded at 223 m/z for Negative Trial 2. This differentiation may have occurred due to atmospheric conditions and RP emissions upon failure.

Overall, the negatively charged ion trials conducted produced extremely similar results. In addition, a distinction change in peaks was noted between normal operational state at 5-7V and failure state at 9V.

Mass-to-Charge Peaks Indicating Failure

For each set of trials run, whether it included the positively charged ions or negatively charged ions, unique peaks were identified between a normal operational state and failure. As discussed previously, the normal operational state of a RP is at 5V based on factory standard settings. Based on Table 4.2 and 4.3, the collected signatures for 5V and 7V had the same distinct peaks for both Positive Trials 1 & 2. The same occurred for Negative Trials 1 & 2. However, a major change occurred in the signature readings upon the failure state being reached at 9V—the failure state was entered once the RP experienced a power surge and was not able to return to an operational state.

Table 4.4 below displays the voltage trial peaks at 5V, 7V, and 9V for all trials performed. All data is consolidated from Tables 4.2 and 4.3. The voltage steps for 5V-9V are shown as these are the most indicative changes between a normal (5-7V) versus failure state (9V).

TABLE 4.4

| All Trials - Mass to Charge Peaks between Operational and Failed States | | | | |
|---|---|---|---|---|
| Voltage Step | Positive Trial 1 - m/z Peaks | Positive Trial 2 - m/z Peaks | Negative Trial 1 - m/z Peaks | Negative Trial 2 - m/z Peaks |
| 5 V | 152, 240, 536, 610 | 240, 536, 610 | 151, 179 | 151, 179 |
| 7 V | 152, 240, 536, 610 | 240, 536, 610 | 151, 179 | 151, 179 |
| 9 V | 240, **461** | 240, **461** | **117**, 157, 179, **211** | **117**, 157, 179, **223** |

Based on Table 4.4, the distinct peaks in the interpreted signatures are bolded. For Positive Trial 1 & 2, the major peak differentiator occurred at 461 m/z. This mass-to-charge ratio did not have any activity recorded in a normal operational state (5-7V steps). For Negative Trial 1 & 2, the major peak differentiators occurred at 117 m/z, 211 m/z, and 223 m/z. Again, these mass-to-charge ratios did not have any activity recorded in a normal operational state (5-7V steps). These differentiators note a significant change in the chemicals emitted by the RP in a failed state and interpreted by the mass spectrometer.

Tandem Mass Spectrometry Results

Figure 27:
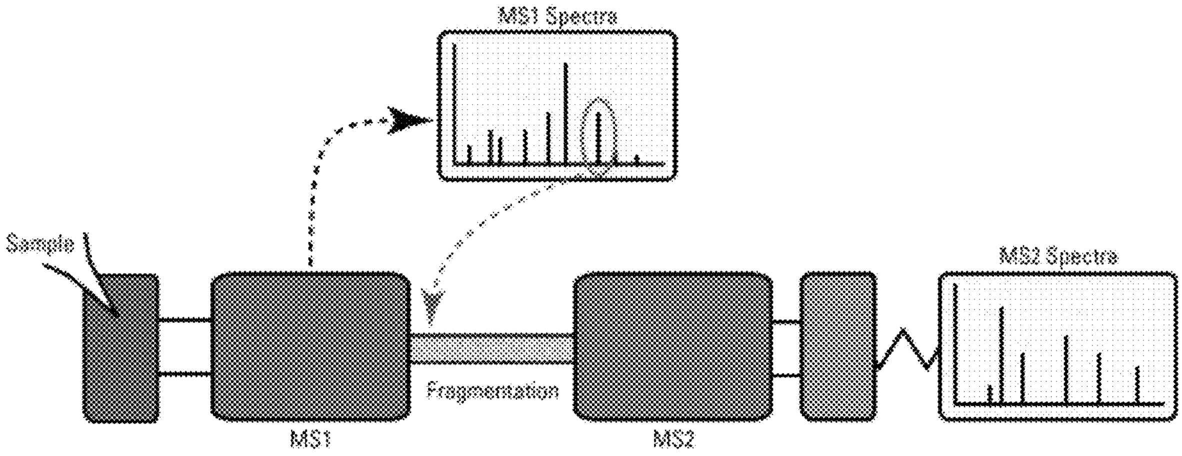
FIG. 27 shows a tandem mass spectrometry process.

The focus of this study was on a general change within the system and distinguishing characteristics within the holistic spectrum generated per voltage step using pure MS procedures. However, tandem mass spectrometry (MS/MS) was also capable with the LTQ Ion Trap Mass Spectrometer used. FIG. 27 shows the process of tandem mass spectrometry being used on a sample ("Overview of Mass Spectrometry: Thermo Fisher Scientific—US", n.d.).

During this process, a sample is injected, ionized, accelerated, and analyzed by the first mass spectrometer (MS1). In MS1, the ions are fragmented and analyzed by a second stage of mass spectrometry (MS2). MS2 generates the spectrum for the corresponding ion fragments.

Figure 28:
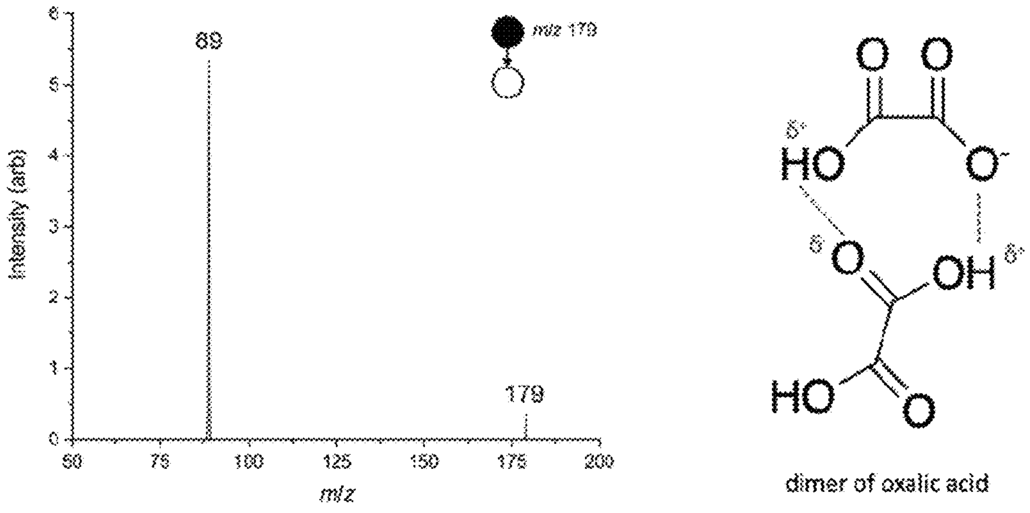
FIG. 28 shows negative ion dimer of oxalic acid reading breakdown.

During the data collection for negatively charged ion trials, MS/MS data was collected for the breakdown of 151 m/z and 179 m/z. Both of these peaks were collected during the normal operational states of 5V and 7V for Negative Trials 1 & 2. FIG. 28 shows the dimer for Oxalic acid and its breakdown.

The m/z ratio for the negative ion dimer of Oxalic acid is 179 m/z. The m/z ratio for the dimer of Oxalic acid is 180 m/z, but a proton was donated in the ionization process resulting in a negative ion and 179 m/z ratio. The high intensity reading at 89 m/z is due to the breaking of a hydrogen bond and the second ion losing a proton. The negative ion dimer is broken into two fragments with an 89 m/z.

Figure 29:
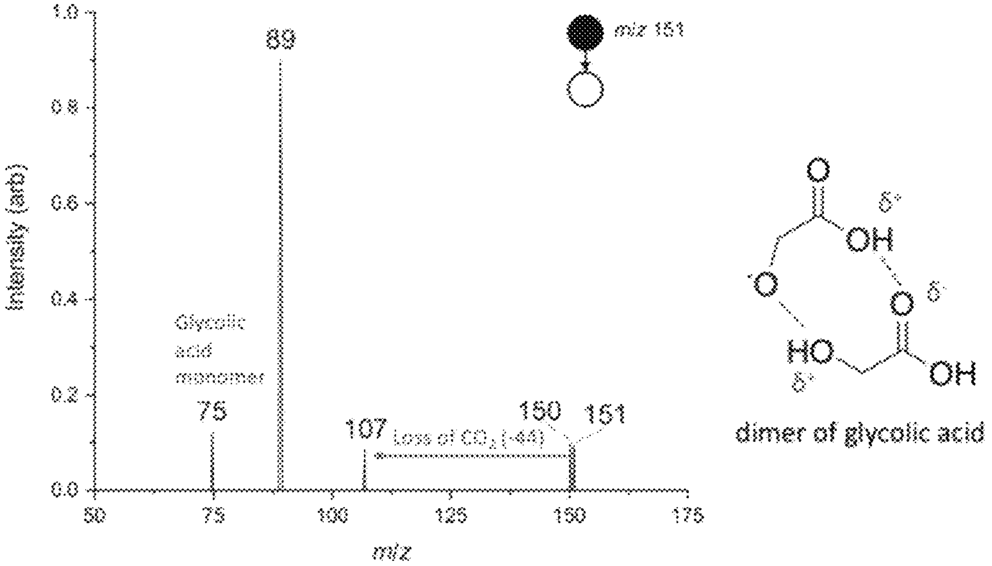
FIG. 29 shows negative ion dimer of glycolic acid reading breakdown.

Further in the fragmentation process, FIG. 29 displays the dimer for Glycolic acid and its breakdown. The m/z ratio for the negative ion dimer of Glycolic acid is 151 m/z. The m/z ratio for the dimer of Glycolic acid is 152 m/z, but a proton was donated in the ionization process resulting in a negative ion and 151 m/z ratio. As the negative ion dimer is broken down, it loses a Carbon Dioxide with the loss of 44 m/z resulting in the measurement of a negative ion at 107 m/z. The 89 m/z is the negative ion of Oxalic acid broken down shown in FIG. 28. In a paper from Baker & Gabryelski, an ion trap collision induced dissociation spectrum collected a negative Glycolate ion at 75 m/z (2007, p. 129). Thus, the negative ion of Glycolic acid monomer is at 75 m/z as shown in FIG. 29. The 75 m/z results from the Glycolic acid having a 76 m/z, with a proton being donated decreasing the mass and creating a negative ion charge. The final breakdown shown is in FIG. 30 consisting of a negative ion of Hydroxypentanoic acid. In a paper from Fay et. al. (2006), Hydroxypentanoic acid is observed as a byproduct of a polymer breakdown via hydrolysis (p. 852). The recorded m/z ratio is 117 m/z based on the tandem mass spectrometry results collected from the study (p. 852).

Based on the graphic, the m/z ratio for a negative ion of Hydroxypentanoic acid is 117 m/z. This is similar to the results from the Fabienne paper. The 117 m/z ratio for the negative ion of Hydroxypentanoic acid results from a donation of a proton changing the molecular mass from 118 m/z to 117 m/z. The proton donation also results in the negative charge. Upon losing the water molecule, 18 m/z, and Carbon Dioxide, 44 m/z, the breakdown for the ion of Hydroxypentanoic acid is seen. The 117 m/z was the differentiating m/z ratio read at the failure state.

Figure 30:
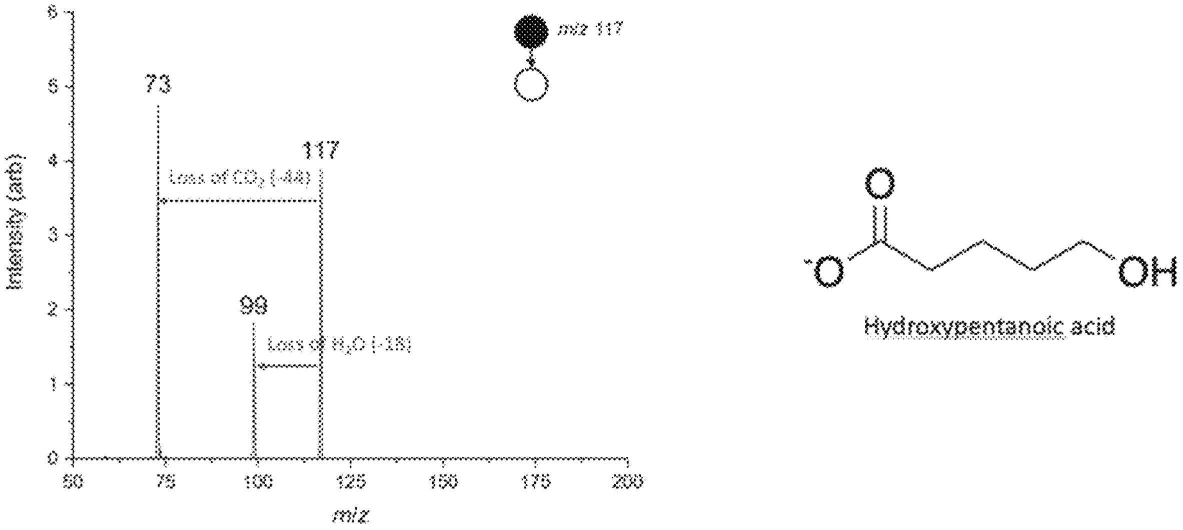
FIG. 30 shows negative ion of hydroxypentanoic acid reading breakdown.

The main features noticed in FIGS. 28-30 are the loss of 44 m/z and 18 m/z. Upon these molecules fragmenting, a neutral molecule is lost, and the remaining ion is observed. The loss of a 44 m/z is a Carbon Dioxide molecule indicating a Carboxylic acid. The loss of an 18 m/z is a water molecule indicating an alcohol. "Carboxylic acids (RCOOH), relatively weak organic acids, are primary constituents of many water-soluble fluxes, along with a detergent (called a 'surfactant' in the trade) and, of course, water" ("What to do About Flux Residues", n.d.). The resulting breakdown most likely occurred from a water-soluble flux residue in the solder of the microelectronics. Further research may need to be done to identify the soldering amount and packaging materials used in a RP. Upon the power supply components heating up, the residues are vaporized and sampled via the APCI-MS process.

Detecting Failure

From the RP trials conducted, the operational state versus failure state was easily identifiable. As the factory standard setting of 5V was used as a control in relation to the other voltage steps, distinct differences were noted between the recorded signatures. These differences, consisting of the unique peaks in each signature, identify when the failure point was reached. In addition, the failure point could be seen while physically present during the trials. As shown in Table 4.4, the greatest distinctions within the data occur at 9V, or when the RP reached the failure state. For both the Positive & Negative trials, distinct peaks were recorded and referenced.

The chemical signatures detected utilizing APCI-MS and resulting data collected prove it is feasible to identify failure in electronics. As an RP is a representative unit of an electronic device, failure may be detected based on a change in the chemical composition. This change, as noted, may occur due to failure or another fault involved in hindering normal operations.

CONCLUSIONS

The data herein provide a solution to detect electronic fault and failure in electronic systems. The need to implement fault and failure detection methods is critical. The use of APCI and MS technology was introduced as a likely method to identify chemical changes between an operational state versus failure state. This non-invasive method allows for the detection without inhibiting use and functionality of the system.

The invention provides a method to determine the feasibility of chemical detection by using these technologies. A RP poised as the experimental unit due to its simplicity, cost effectiveness, and analogous nature to multiple electronic systems. Through the research, distinct signatures were found upon trials conducted revealing differences, such as mass to charge peaks and locations, between a normal state of operation and the failure state. This research successfully proves the feasibility of using APCI-MS procedures for chemical detection to determine a fault, or difference in state from normal operations of an electronic system.

The focus was to determine the feasibility of using chemical detection through APCI-MS procedures to identify failure within electronic systems. The APCI-MS signatures produced would vary based on the voltage step tested, operational state, and ion charge used. Table 4.2 and 4.3 showcase the distinct peaks amongst trials and respective voltage steps which note a difference amongst signatures collected. These peaks distinguish the different mass-to-charge ratios that appear at certain voltage steps; ultimately the voltage step signatures were compared for key differences between each.

Two positively charged ion trials were conducted. For each trial, the 4 voltage steps as noted were tested. Positive Trial 1 produced 5 distinct mass to charge ratios (Table 4.2) and Positive Trial 2 produced 4 distinct mass to charge ratios (Table 4.2). For both trials, 4 of the 5 mass to charge ratios were found to be the same. In addition, two negatively charged ion trials were conducted. Again, both trials each had the 4 voltage steps tested. Negative Trial 1 produced 4 distinct mass to charge ratios (Table 4.3) and Negative Trial 2 produced 4 distinct mass to charge ratios. For both trials, 3 of 4 mass to charge ratios were found to be the same. Therefore, it is likely that the distinct peaks identified may be replicated in further trials.

Table 4.4 lists the primary peak differentiators between the voltage step signatures in a normal state versus failure state. The normal state may be described as a RP maintaining operational function. The normal state was achieved at both 5V, the factory standard setting, as well as 7V for all trials. The failure state may be described as a RP losing functionality and ultimately no longer suitable for use. The failure state was reached at 9V for all trials. The most notable differences occurred at failure for mass-to-charge ratios that only appeared in the failure state. The peaks at 461 m/z (Table 4.4) for positively charged ion trials, and peaks at 117 m/z and 211 m/z (Table 4.4) for negatively charged ion trials were not apparent in the other trials tested at 5V, 7V, and 11V. The failure peaks indicate that there is a difference between the normal state and failure state, which may allow for chemical detection to be a feasible means of detection for electronic failure.

Certain components were overheated due to the power surge, ultimately causing failure for the RP. By using chemical detection, the negative ion of Oxalic acid was observed to be associated with the overheated power supply. Also observed was the negative ion of hydroxypentanoic acid due to the loss of a water molecule and carbon dioxide molecule in tandem mass spectrometry. Through this detection, the appearance of the Oxalic acid ion may be analyzed to note power failure within a system if constantly monitored for predictive failure analysis. This observation might serve as an indicator of failure upon breakdown into the failure state.

The RP holds similar characteristics to other electronic systems and other industries. As electronic systems hold similar compositions, different areas can be targeted and compared with one another. A distinct failure was seen within the RP failing between a normal operational voltage versus a voltage causing it to fail based on differing mass to charge ratios. Thus, other components may be tested to find like failure with differing results using the APCI-MS technique as chemical compositions may differ between normal state and failure state.

Overall, the APCI-MS technique provides a non-invasive method to detect a chemical change between an operational state and failure state. As the method does not interfere with the operability of the system, it can be expanded for testing on other electronic systems and target areas. Therefore, the feasibility of detecting electronic failure with chemical signature analysis via APCI-MS is shown. Further, APCI-MS may be applied to other electronic and like systems in different targeted areas to identify failure.

Reproducibility may be achieved by utilizing the same experimental unit and methodology performed for this experiment. Similar results were shown for both the positively charged and negatively charged ion trials conducted in this experiment. Thus, the experimental unit in the RP and experimentation procedure via APCI-MS may be expanded to test other components within the RP for predictive failure. Upon testing, multiple RPs can be used to target different components within the system to identify different failure modes and potential differences in signature trends. The reproducibility focuses on the repeatability of the trials and similar data resulting from like experimentation.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein.

What is claimed is:

1. A system for analyzing operational status of an electronic instrument, the system comprising:

a sampling module that operably couples to an electronic instrument in such a manner that the sampling module receives a vapor emitted from the electronic instrument, the sampling module comprising an ionization source and one or more mass analyzers to thereby produce a chemical signature of one or more analytes in the vapor; and an analysis module operably coupled to the sampling module to receive the chemical signature of the one or more analytes in the vapor and compare the received chemical signature to a database of known chemical signatures to thereby determine operational status of the electronic instrument, wherein the one or more analytes is at least one analyte selected from the group consisting of oxalic acid, hydroxypentanoic acid, and a combination thereof.

2. The system of claim 1, wherein the ionization source is an atmospheric pressure chemical ionization (APCI) source.

3. The system of claim 2, wherein the APCI source comprises an inlet that is configured to receive the vapor emitted from the electronic instrument.

4. The system of claim 3, wherein the APCI source ionizes the vapor to produce ions of the one or more analytes that are transferred to the one or more mass analyzers.

5. The system of claim 4, wherein the wherein system comprises a single mass analyzer.

6. The system of claim 5, wherein the single mass analyzer is a component of a miniature mass spectrometer.

7. The system of claim 4, wherein the wherein system comprises a plurality of mass analyzers arranged for tandem mass analysis.

8. A method for analyzing operational status of an electronic instrument, the method comprising:

receiving a vapor emitted from an electronic instrument to a sampling module that is operably coupled to the electronic instrument, the sampling module comprising an ionization source and one or more mass analyzers to thereby produce a chemical signature of one or more analytes in the vapor; and comparing, via an analysis module operably coupled to the sampling module, the received chemical signature to a database of known chemical signatures to thereby determine operational status of the electronic instrument, wherein the one or more analytes is at least one analyte selected from the group consisting of oxalic acid, hydroxypentanoic acid, and a combination thereof.

9. The method of claim 8, wherein the method is repeated at one or more additional points in time to continuously monitor a status of the electronic instrument.

10. The method of claim 9, wherein a change in the received chemical signature over time indicates a change in operational status of the electronic instrument.

11. The method of claim 10, wherein the change in predictive of failure of the electronic instrument.

12. The method of claim 8, wherein the method is conducted without interfering with the operability of the electronic instrument.

13. The method of claim 8, wherein the method is conducted non-invasively on the electronic instrument.

14. The method of claim 8, wherein the method is conducted using a miniature mass spectrometer.

* * * * *